US012752859B2

(12) United States Patent
Phillipe et al.

(10) Patent No.: US 12,752,859 B2
(45) Date of Patent: Oct. 6, 2026

(54) REMOVABLE MUDFLAP ASSEMBLY AND METHOD FOR A TRUCK

(71) Applicant: Dragonflaps LLC, Lakeville, MN (US)

(72) Inventors: Jerome L. Phillipe, Lakeville, MN (US); Jeffrey A. Phillipe, Lakeville, MN (US)

(73) Assignee: Dragonflaps LLC, Lakeville, MN (US)

( * ) Notice: Subject to any disclaimer, the term of this patent is extended or adjusted under 35 U.S.C. 154(b) by 0 days.

(21) Appl. No.: 19/431,897

(22) Filed: Dec. 23, 2025

(65) Prior Publication Data

US 2026/0242004 A1 Aug. 20, 2026

Related U.S. Application Data

(62) Division of application No. 29/990,285, filed on Feb. 20, 2025, now Pat. No. Des. 1,110,221.

(51) Int. Cl.
*B62D 25/16* (2006.01)

(52) U.S. Cl.
CPC .................................. *B62D 25/163* (2013.01)

(58) Field of Classification Search
CPC .............................. B62D 25/163; B31D 43/28
USPC .......................................................... 280/848
See application file for complete search history.

(56) References Cited

U.S. PATENT DOCUMENTS 3,934,901 A * 1/1976 Hammerly ........... B62D 25/188 280/851
3,954,281 A 5/1976 Juergens
4,165,092 A 8/1979 Herlein
4,726,599 A * 2/1988 Antekeier ............ B62D 25/188 280/851
D308,958 S 7/1990 Knox
5,121,944 A 6/1992 Haddox
(Continued)

FOREIGN PATENT DOCUMENTS

CA 2955509 1/2023

OTHER PUBLICATIONS

Aries, "Aries 111900 12" X 18" Removable Universal Mud Flaps.", "URL: https://www.amazon.sg/ARIES-111900-Removable-Universal-Flaps/dp/B006VENTAM", Nov. 22, 2021.
(Continued)

*Primary Examiner* — Hau V Phan
(74) *Attorney, Agent, or Firm* — Charles A. Lemaire; Lemaire Patent Law Firm, P.L.L.C.

(57) ABSTRACT

A pair of mudflap brackets are each made from a respective planar sheet of metal, such as steel, that is cut out and then folded at two right-angle bends to form three planar sections that are perpendicular to each other, i.e., a back vertical plate section, a top horizontal plate section, and an inside vertical plate section. In some embodiments, a rear vertical edge of the inside vertical plate section is immediately adjacent the back vertical plate section and welded to the back vertical plate section, thus forming a durable rigid three-dimensional structure to which a post sized to slide into a corresponding socket on the vehicle is welded, and respective bolts, lock washers and nuts secure each bracket to the vehicle. Each rigid 3D structure of mudflap bracket and post provide a strong and durable support for a respective mudflap. In some embodiments, optional LED light fixtures are included.

20 Claims, 19 Drawing Sheets

(56) References Cited

U.S. PATENT DOCUMENTS

| | | | | | |
|---|---|---|---|---|---|
| D330,692 | S | 11/1992 | Hammond | | |
| 5,816,617 | A | 10/1998 | Huang | | |
| 6,070,893 | A | 6/2000 | Thorndyke | | |
| 6,135,502 | A | 10/2000 | Howe | | |
| 7,407,194 | B1 | 8/2008 | Alley | | |
| 7,708,315 | B1 | 5/2010 | Dumitrascu | | |
| D680,929 | S | 4/2013 | Hanson | | |
| 8,579,314 | B2 | 11/2013 | Prazen et al. | | |
| 8,746,804 | B2 | 6/2014 | Kraenzle | | |
| 8,905,418 | B2 | 12/2014 | Dixon | | |
| 9,004,538 | B2 | 4/2015 | Eklund et al. | | |
| 9,045,174 | B2 | 6/2015 | Dixon | | |
| D792,823 | S | 7/2017 | Senatro | | |
| 9,724,974 | B2 * | 8/2017 | Schmeichel | ......... | B62D 25/182 |
| 9,802,652 | B1 | 10/2017 | Cox | | |
| 9,963,174 | B1 | 5/2018 | Cooper | | |
| 10,207,744 | B1 | 2/2019 | Smith | | |
| 10,882,571 | B2 * | 1/2021 | Butler | .................. | B62D 35/008 |
| 10,933,921 | B1 | 3/2021 | Jacobson | | |
| 11,767,064 | B2 * | 9/2023 | Urista | .................. | B62D 25/188 280/154 |
| D1,015,243 | S | 2/2024 | Crawford | | |
| 2002/0056985 | A1 | 5/2002 | Szakurski | | |
| 2008/0100052 | A1 | 5/2008 | Oberholtzer | | |
| 2008/0185810 | A1 * | 8/2008 | Archer | ................. | B62D 25/188 280/154 |
| 2011/0107716 | A1 * | 5/2011 | Foley | .................... | E04B 1/2403 52/699 |
| 2013/0193300 | A1 * | 8/2013 | Eklund | ................ | B62D 25/163 248/610 |
| 2014/0312604 | A1 | 10/2014 | Carrillo | | |
| 2019/0351949 | A1 | 11/2019 | Kinney | | |
| 2022/0194480 | A1 | 6/2022 | Stolworthy | | |
| 2024/0067274 | A1 | 2/2024 | Peterson | | |

OTHER PUBLICATIONS

Northwestern Steel Craters, “Frame Mounted Square Tube Receiver Hitch Style Removable Mud Flaps.”, “northweststeelcrafters.com/shop/mud-flaps/frame-mounted-removable-pivoting/18-frame-mounted-square-tube-receiver-hitch-style-removable-mud-flaps-2/”, , Publisher: USPTO Examiner for parent U.S. Appl. No. 29/990,285 internet download May 13, 2025.

* cited by examiner

REMOVABLE MUDFLAP ASSEMBLY AND METHOD FOR A TRUCK

CROSS-REFERENCE TO RELATED APPLICATION

This application is a divisional of U.S. Patent Application Ser. No. 29/990,285, filed Feb. 20, 2025 by Jerome L. Phillipe and Jeffrey A. Phillipe, titled "Removable mudflap bracket for a truck", (which issued as U.S. Design Patent D1,110,221 on Jan. 27, 2026), which is incorporated herein by reference in its entirety.

FIELD OF THE INVENTION

This invention relates to the field of vehicle accessories, and more specifically to a removable mudflap assemblies including mudflaps attached to brackets that are easily attached and easily removed from a pickup truck such as certain models of Ford Super Duty or Chevy Silverado.

BACKGROUND OF THE INVENTION

Mudflaps are essential for preventing debris, mud, water, and other elements from being thrown up by the tires of vehicles, especially trucks. Traditional mudflaps often require permanent installation methods or complex brackets for mounting. As a result, there is a need for a more efficient and easily removable mudflap that can be securely attached to and detached from a truck, especially in applications like Ford Super Duty trucks that are commonly used in both off-road and on-road environments. Various versions of mudflaps are available for pickup trucks, but are difficult to remove and later re-attach to the pickup truck.

What is needed is a set of mudflap assemblies that are simple and readily attachable using existing receiving sockets on the pickup truck, and fastened using a single fastener system such as a bolt, lock-washer and nut, and in addition, are easily removed when the mudflaps are not needed.

SUMMARY OF THE INVENTION

In some embodiments, the present invention provides easily installable and removable mudflaps for Ford Super Duty Trucks and other vehicles that often have square receiver sockets designed for mounting accessories like back lights. However, there is a lack of a simple yet effective design that allows easy and secure mounting and removal of mudflaps that can fit within the constraints of these receiver sockets. The present invention seeks to provide an improved mudflap design that can be securely attached to Ford Super Duty truck using a square peg-and-socket mechanism and can be easily removed when not needed.

We have also invented a new, original, and ornamental design for a REMOVABLE MUDFLAP ASSEMBLY FOR A TRUCK, of which the following is a specification, reference being had to the accompanying drawings, which form a part hereof.

For clarity, the term "inner face" of the mudflap means the vertical side facing the truck's rear tires, and the "outer face" is the vertical side facing a viewer positioned at the rear of the truck. Also, the truck-left-side mudflap bracket is configured for attachment the left rear of the truck and the truck-right-side mudflap bracket is configured for attachment the right rear of the truck, and the claimed design includes a mirror image of the embodiments depicted.

In FIGS. 1-20, the thin shade lines on the surface portions indicate contour and not surface decoration. The broken lines indicate environment and are not part of the claimed design.

Figure 1:
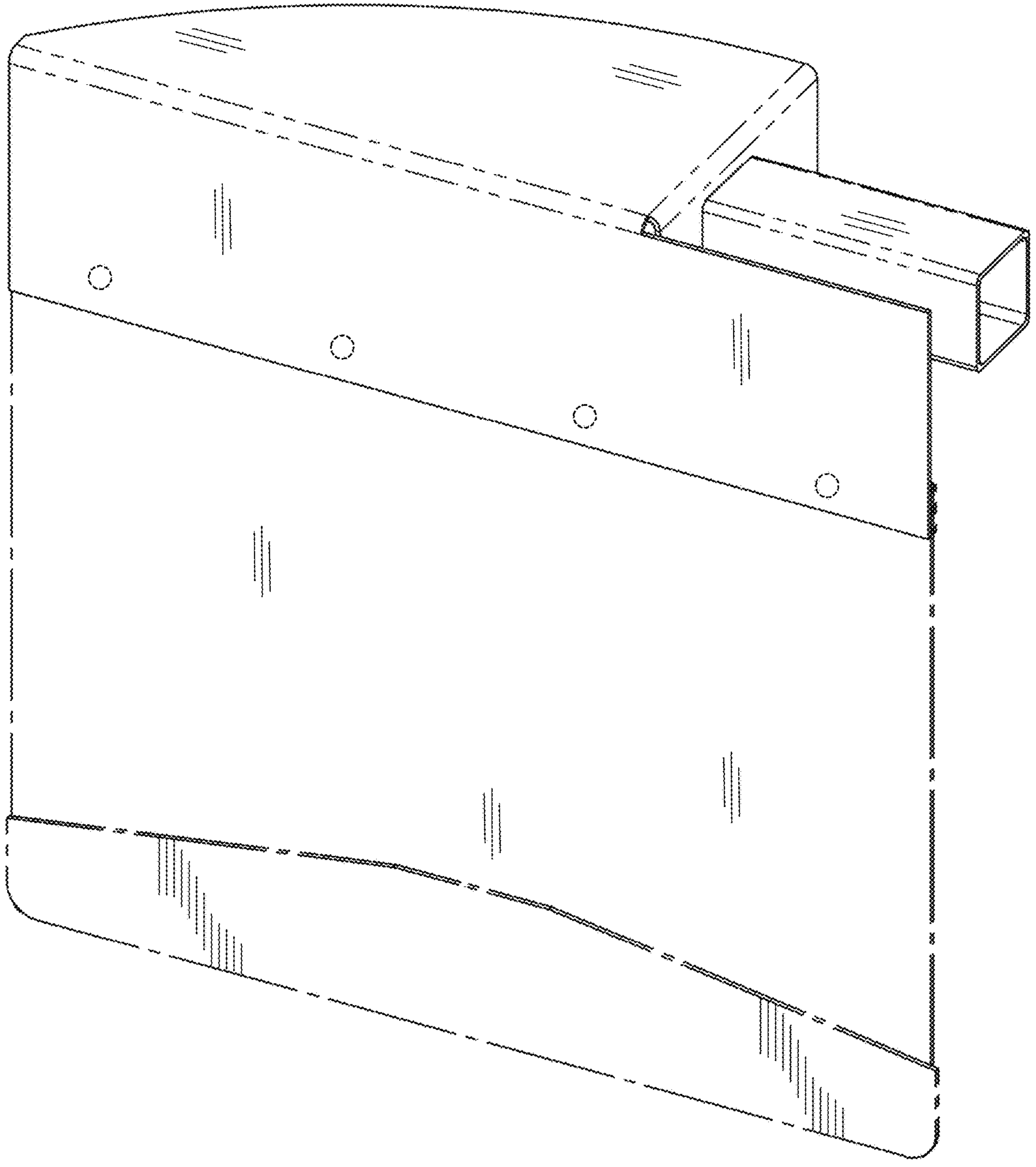
FIG. 1 is a perspective view of a truck-left-side mudflap assembly bracket from the top-right outer-face side, illustrating our new design in its first embodiment.
Figure 2:
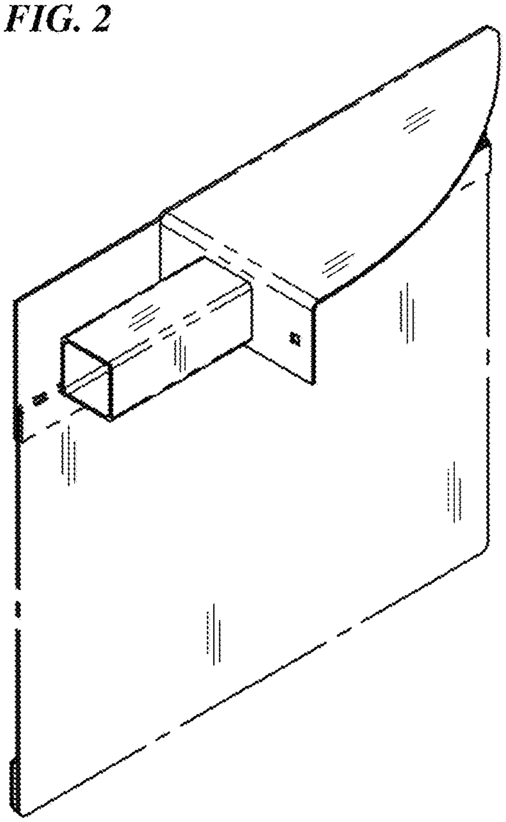
FIG. 2 is a perspective view of the truck-left-side bracket from the top-right inner-face side.
Figure 3:
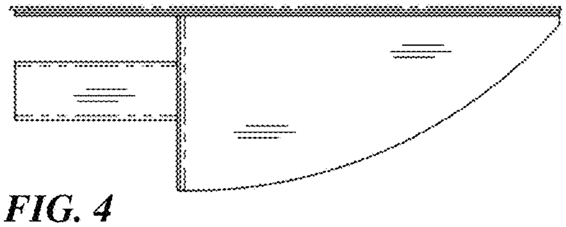
FIG. 3 is a top view of the truck-left-side bracket.
Figure 4:
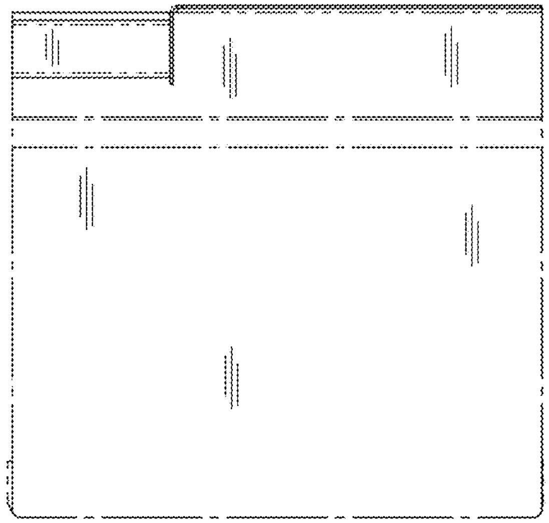
FIG. 4 is an inner-face elevation view of the truck-left-side bracket.
Figure 7:
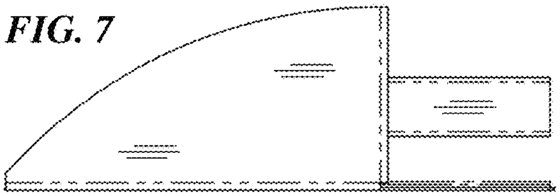
FIG. 7 is a bottom view of bracket the truck-left-side 100.
Figure 5:
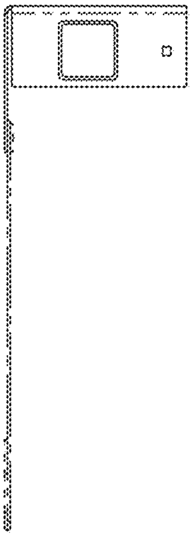
FIG. 5 is a right-end elevation view of the truck-left-side bracket.
Figure 6:
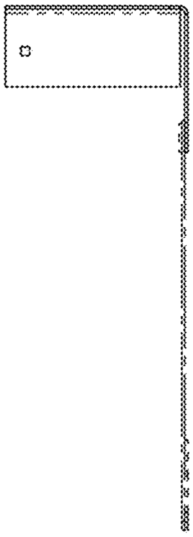
FIG. 6 is a left-end elevation view of the truck-left-side bracket.
Figure 8:
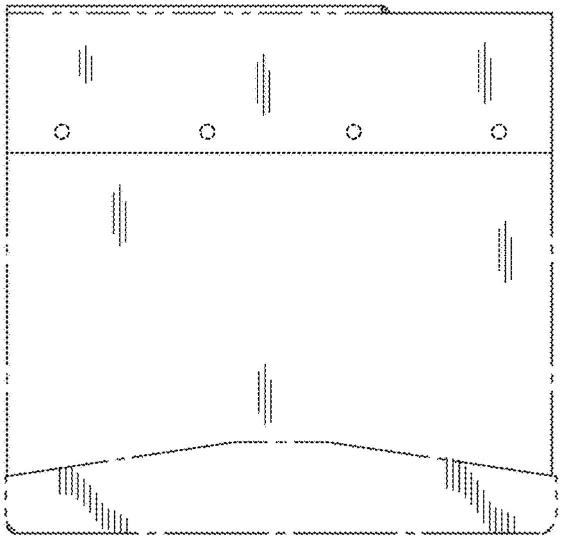
FIG. 8 is an outer-face elevation view of the truck-left-side bracket.
Figure 9:
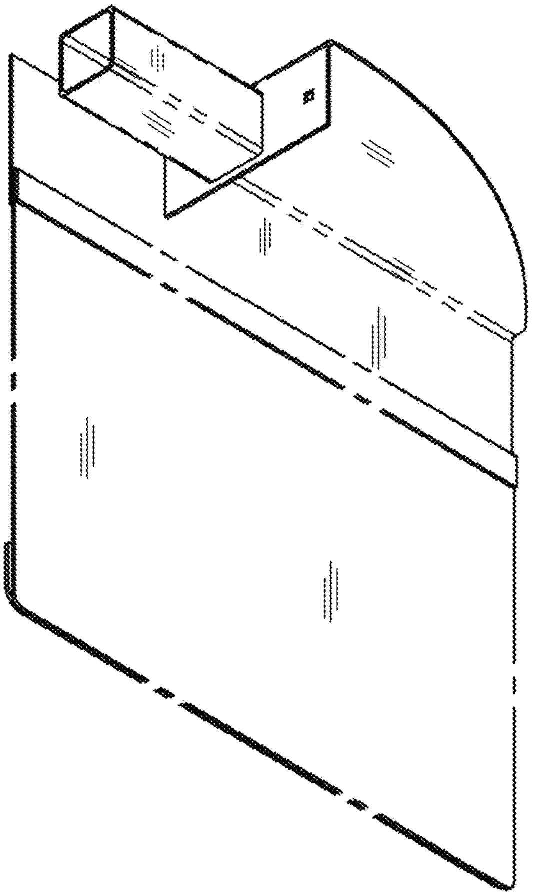
FIG. 9 is a perspective view of the truck-left-side bracket from the bottom-right inner-face side.
Figure 10:
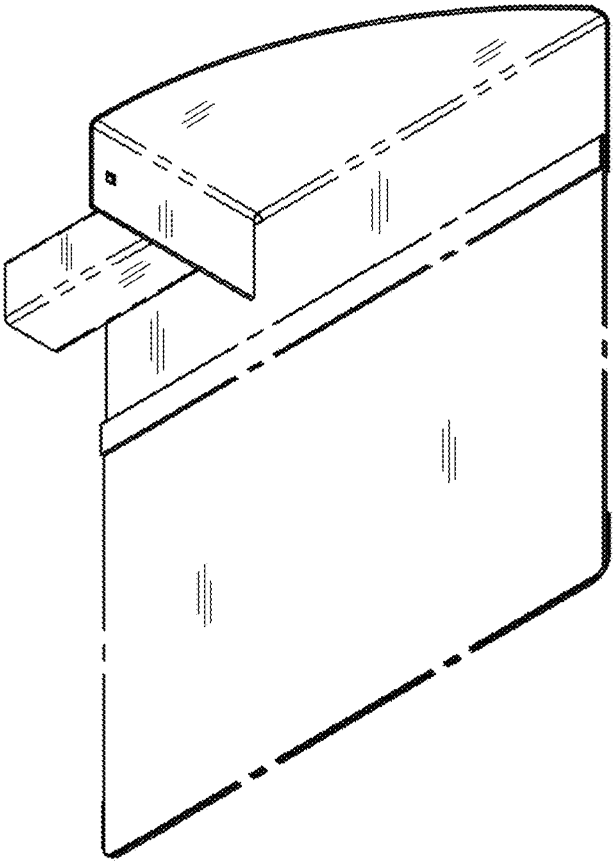
FIG. 10 is a perspective view of the truck-left-side bracket from the bottom-left inner-face side.
Figure 11:
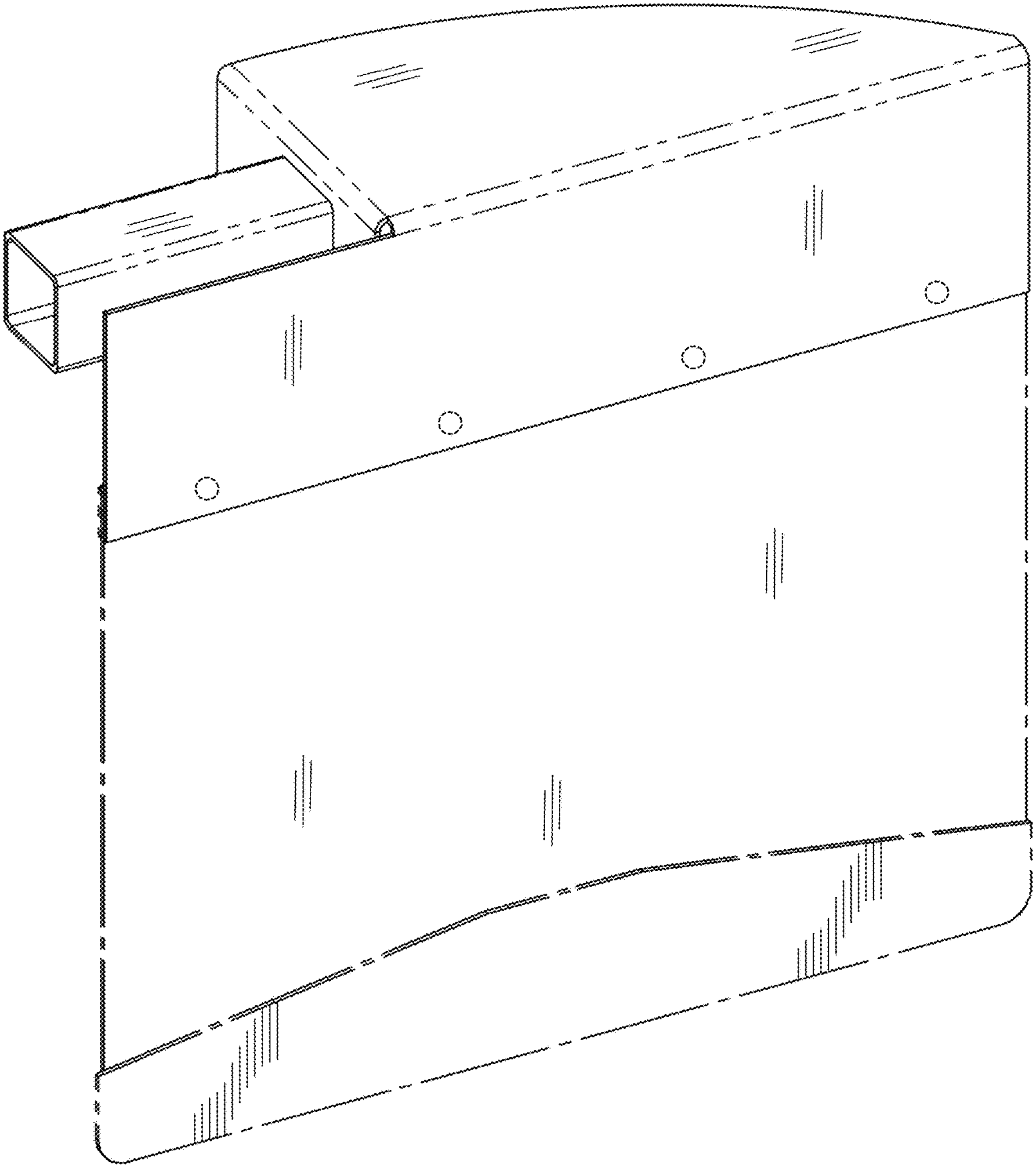
FIG. 11 is a perspective view of a truck-right-side mudflap bracket from the top-left outer-face side, illustrating our new design in its first embodiment, wherein the truck-right-side mudflap bracket is a left-right mirror image version of the truck-left-side mudflap bracket.
Figure 12:
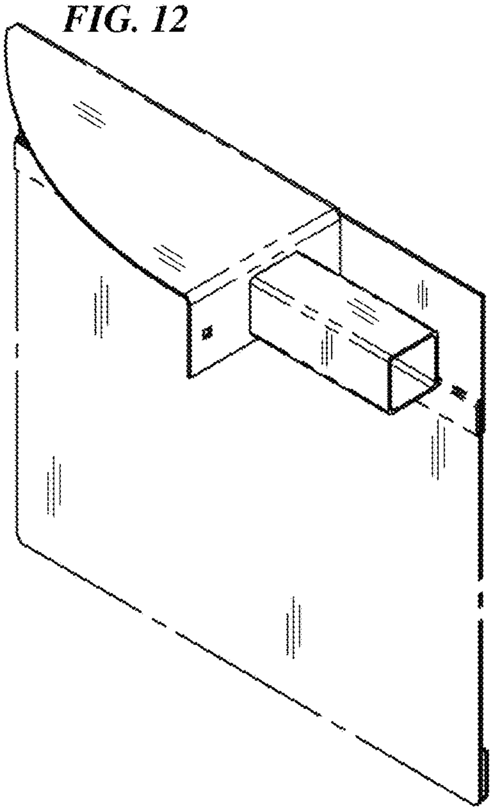
FIG. 12 is a perspective view of the truck-right-side bracket from the top-left inner-face side.
Figure 13:
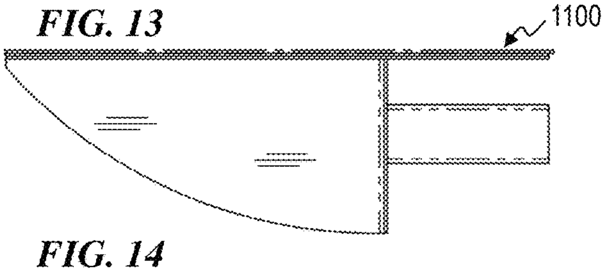
FIG. 13 is a top view of the truck-right-side bracket.
Figure 14:
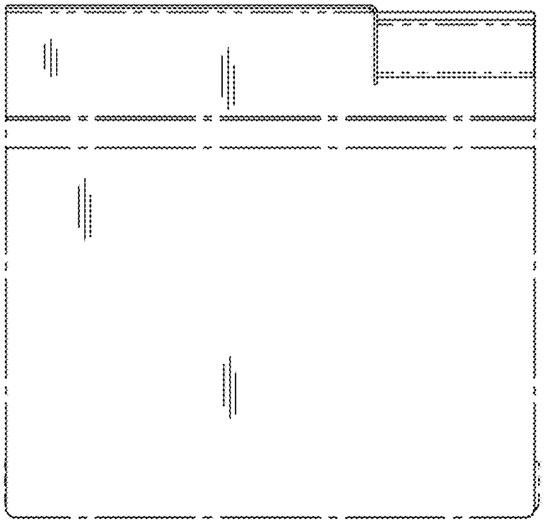
FIG. 14 is an inner-face elevation view of the truck-right-side bracket.
Figure 15:
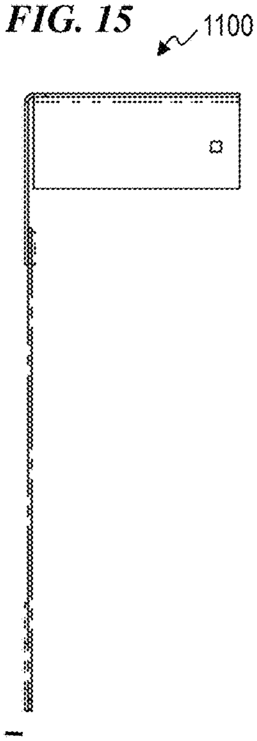
FIG. 15 is a right-end elevation view of the truck-right-side bracket.
Figure 16:
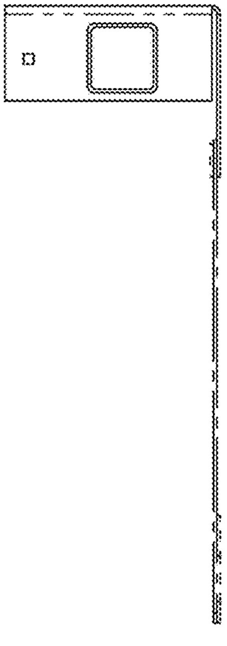
FIG. 16 is a left-end elevation view of the truck-right-side bracket.
Figure 17:
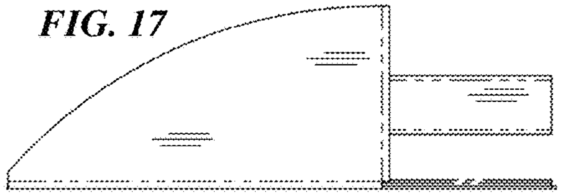
FIG. 17 is a bottom view of the truck-right-side bracket.
Figure 18:
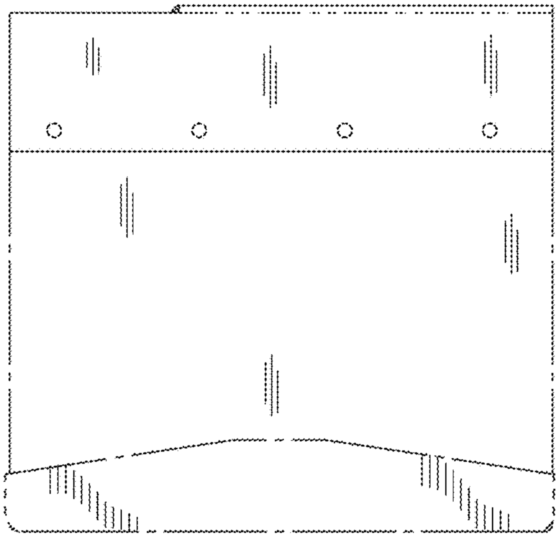
FIG. 18 is an outer-face elevation view of the truck-right-side bracket.
Figure 19:
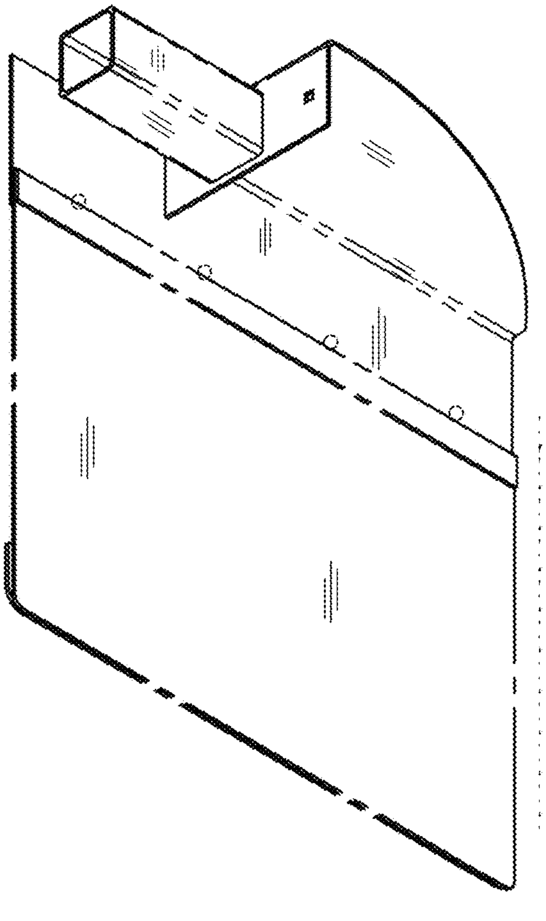
FIG. 19 is a perspective view of the truck-right-side bracket from the bottom-right inner-face side.
Figure 20:
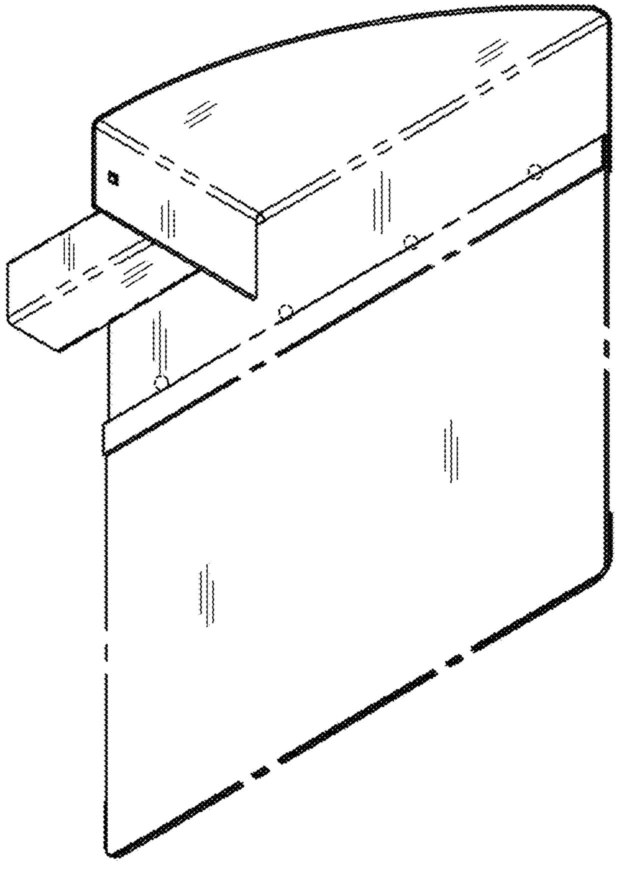
FIG. 20 is a perspective view of the truck-right-side bracket from the bottom-left inner-face side.
Figure 21:
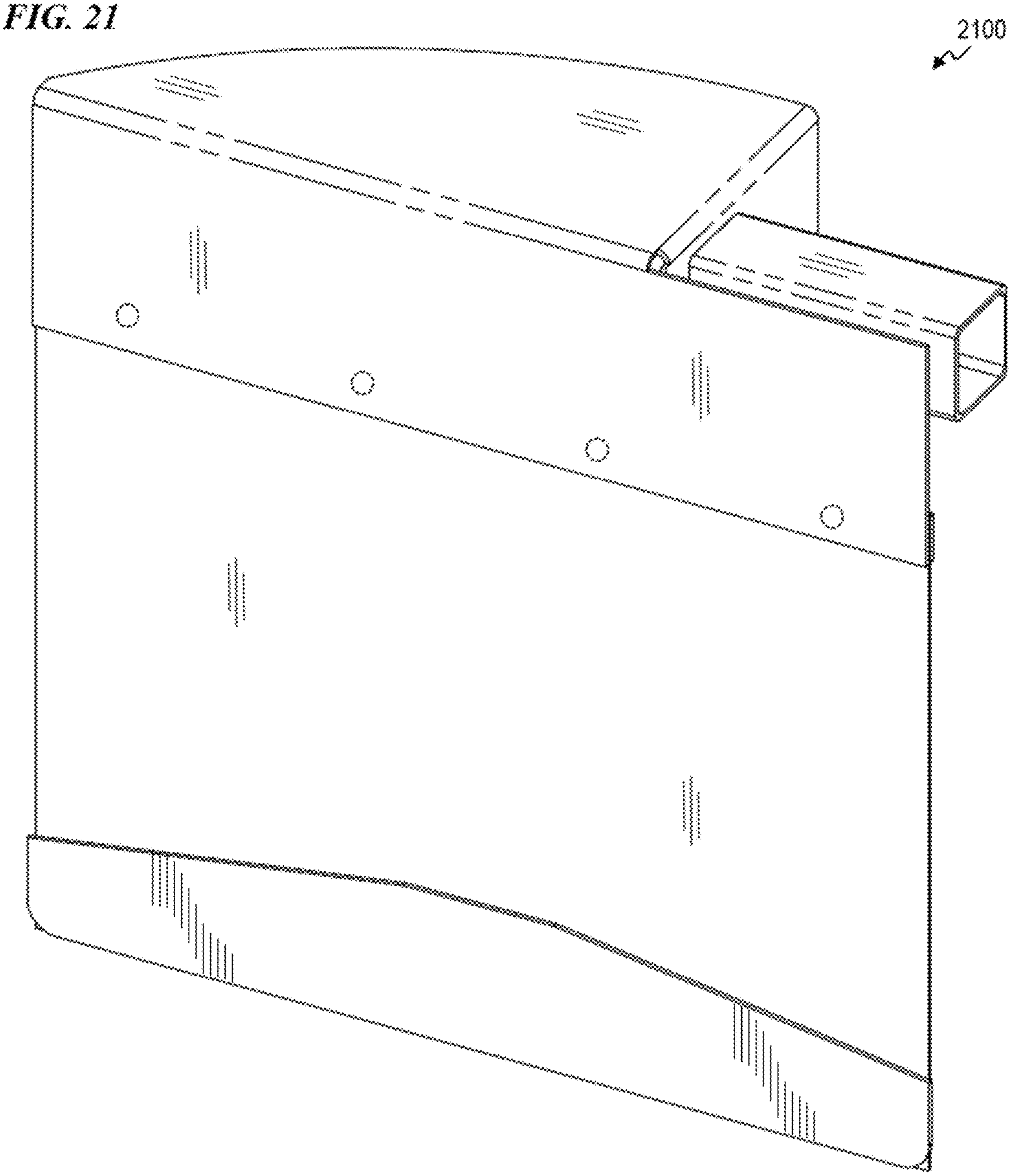

FIG. 21 is a perspective view of a truck-left-side mudflap assembly 2100 from the top-right outer-face side, illustrating our new design in its second embodiment.

Figure 22:
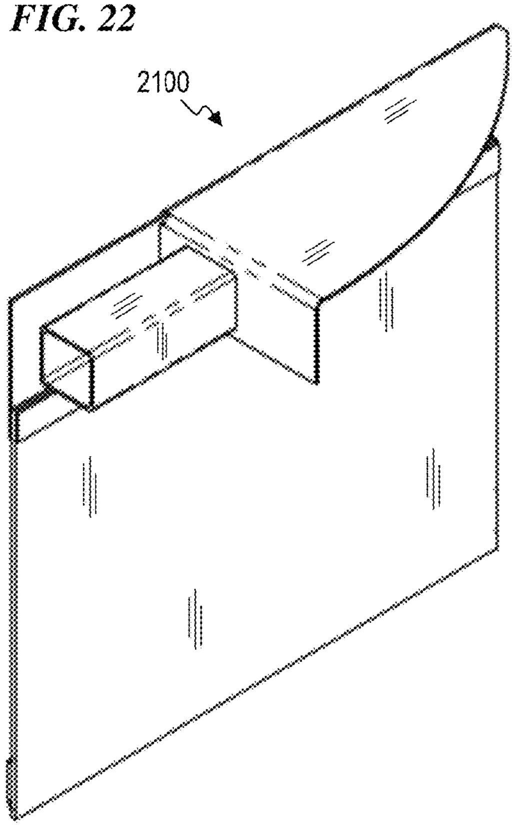

FIG. 22 is a perspective view of mudflap assembly 2100 from the top-right inner-face side.

Figure 23:
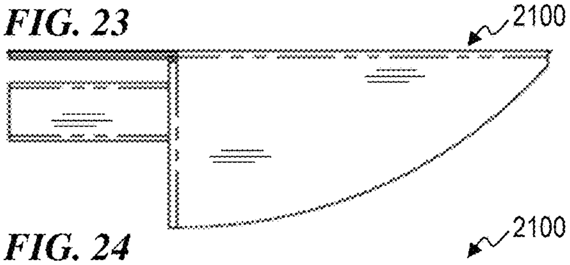

FIG. 23 is a top view of mudflap assembly 2100.

Figure 24:
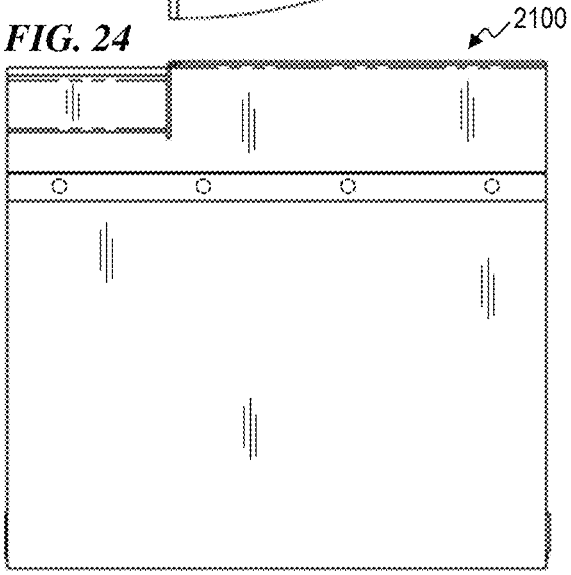

FIG. 24 is an inner-face elevation view of mudflap assembly 2100.

Figure 25:
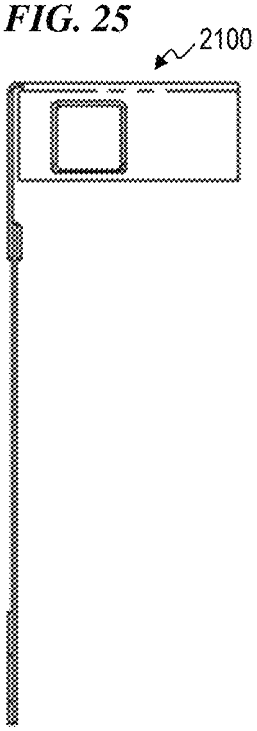

FIG. 25 is a right-end elevation view of mudflap assembly 2100.

Figure 26:
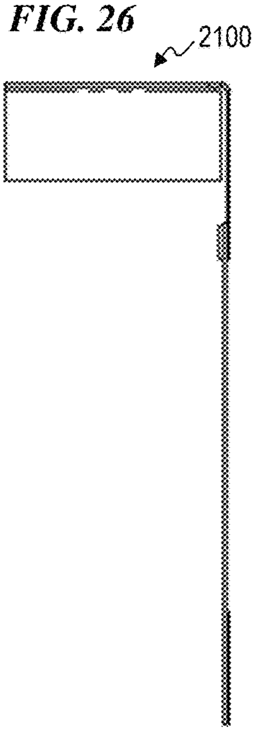

FIG. 26 is a left-end elevation view of mudflap assembly 2100.

Figure 27:
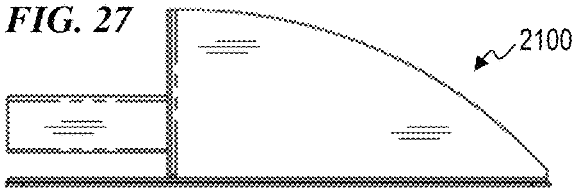

FIG. 27 is a bottom view of mudflap assembly 2100.

Figure 28:
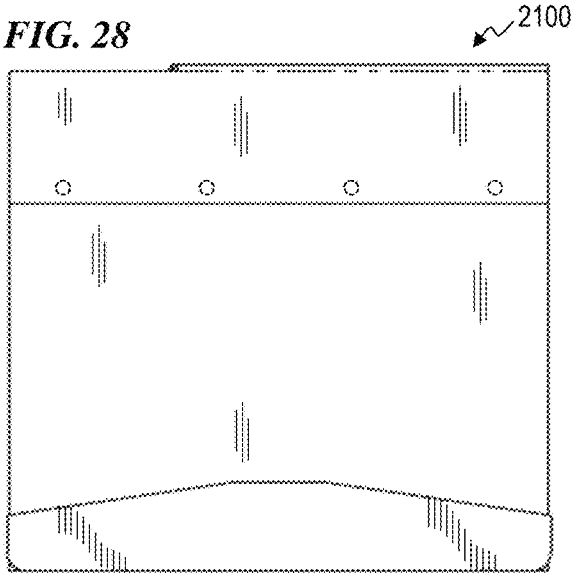

FIG. 28 is an outer-face elevation view of mudflap assembly 2100.

Figure 29:
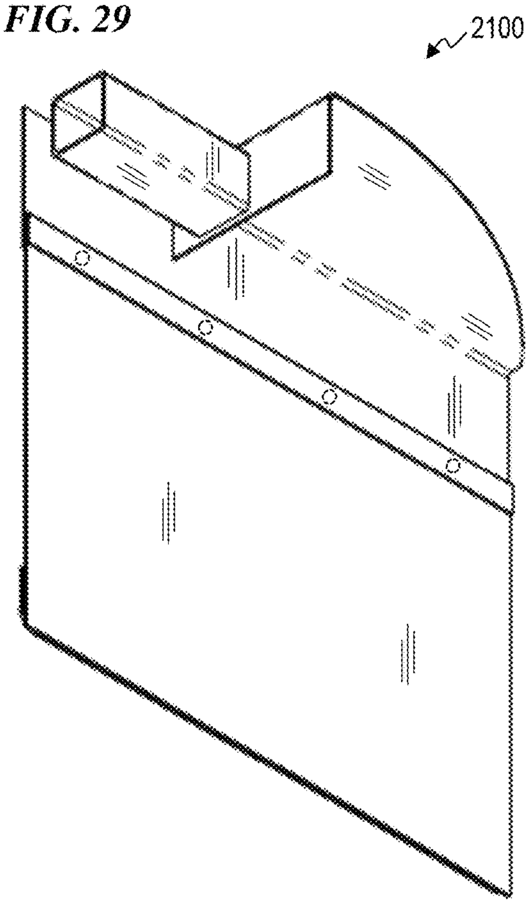

FIG. 29 is a perspective view of mudflap assembly 2100 from the bottom-right inner-face side.

Figure 30:
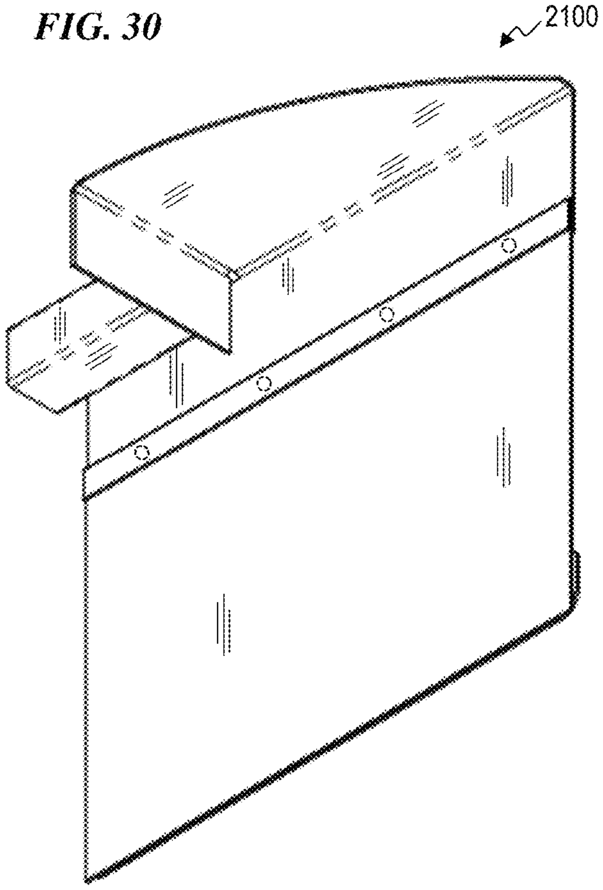

FIG. 30 is a perspective view of mudflap assembly 2100 from the bottom-left inner-face side.

Figure 31:
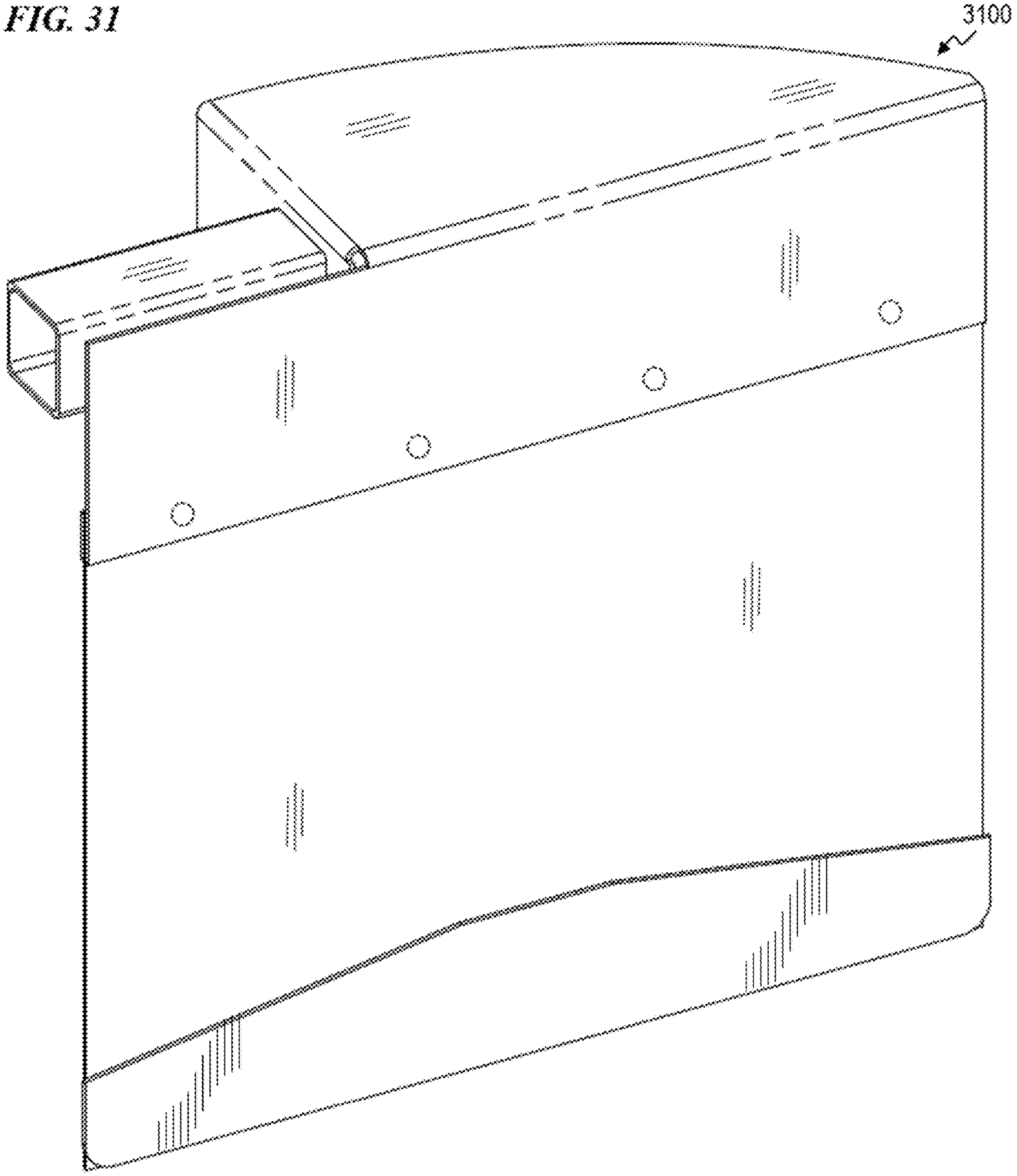

FIG. 31 is a perspective view of a truck-right-side mudflap assembly 3100 from the top-left outer-face side, illustrating our new design in its second embodiment, wherein mudflap bracket 3100 is a left-right mirror image version of mudflap bracket 2100.

Figure 32:
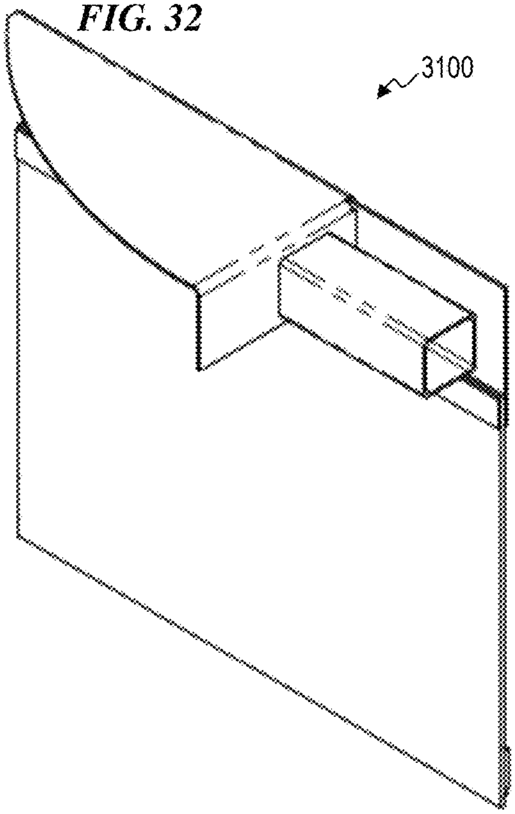

FIG. 32 is a perspective view of mudflap assembly 3100 from the top-left inner-face side.

Figure 33:
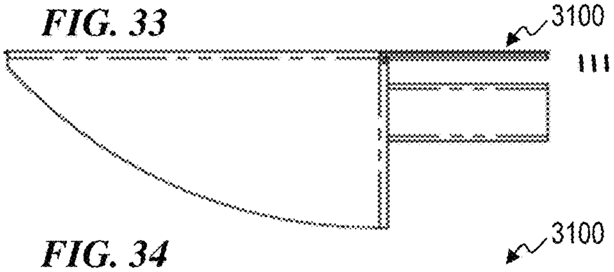

FIG. 33 is a top view of mudflap assembly 3100.

Figure 34:
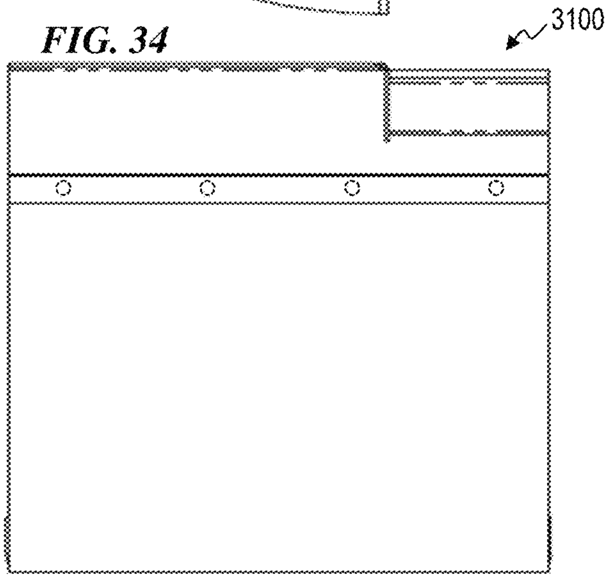

FIG. 34 is an inner-face elevation view of mudflap assembly 3100.

Figure 35:
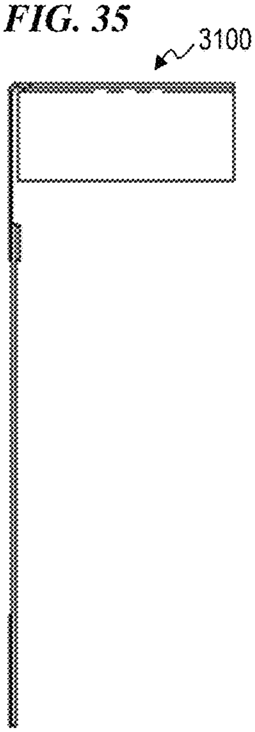

FIG. 35 is a right-end elevation view of mudflap assembly 3100.

Figure 36:
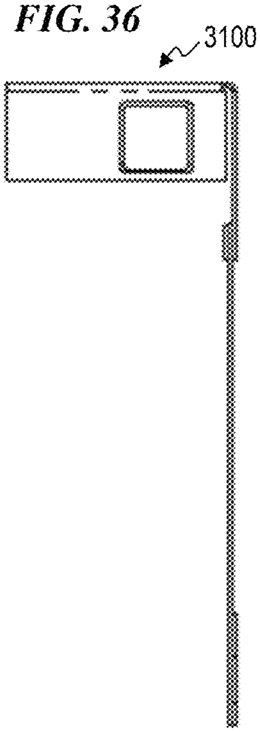

FIG. 36 is a left-end elevation view of mudflap assembly 3100.

Figure 37:
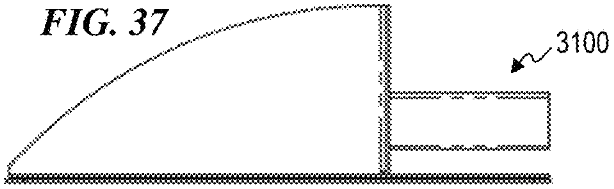

FIG. 37 is a bottom view of mudflap assembly 3100.

Figure 38:
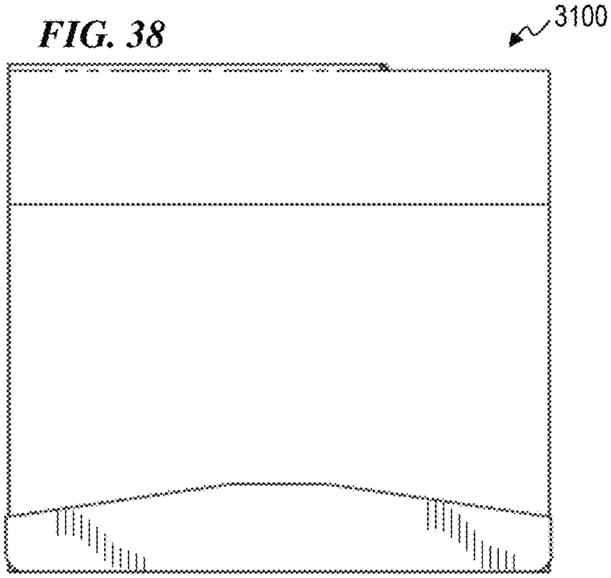

FIG. 38 is an outer-face elevation view of mudflap assembly 3100.

Figure 39:
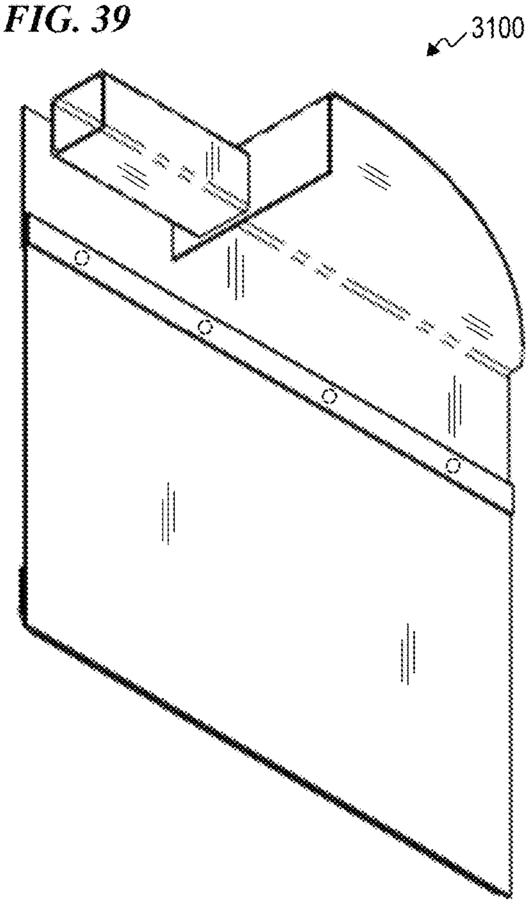

FIG. 39 is a perspective view of mudflap assembly 3100 from the bottom-right inner-face side.

Figure 40:
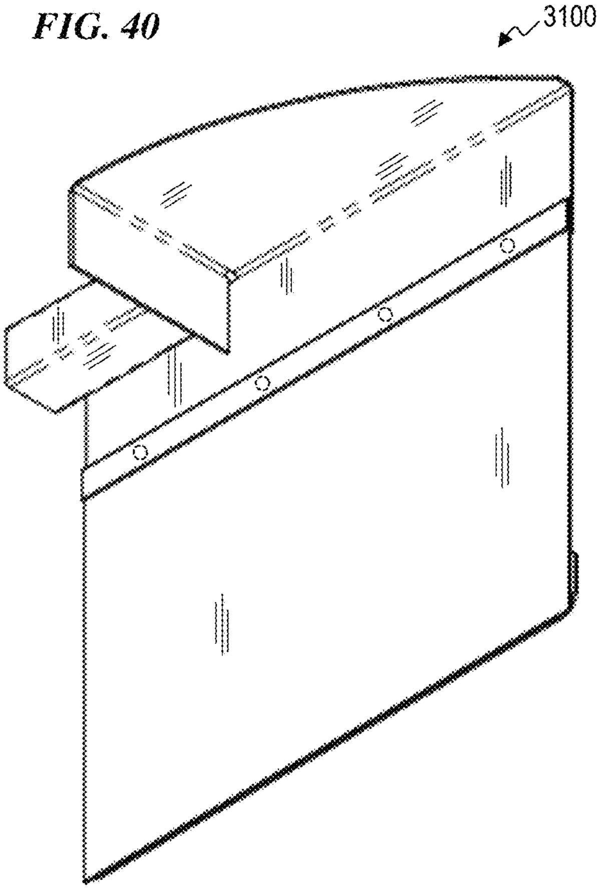

FIG. 40 is a perspective view of mudflap assembly 3100 from the bottom-left inner-face side.

Figure 41:
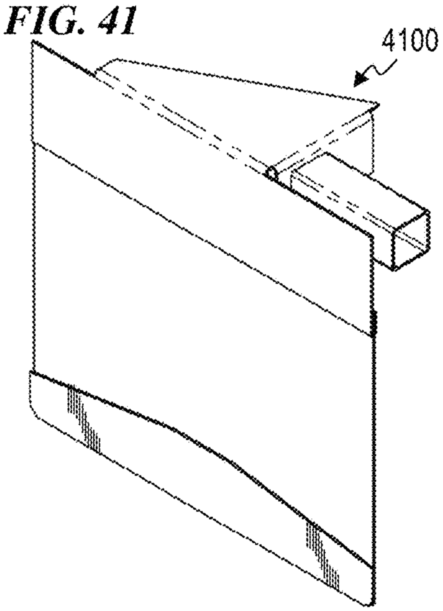

FIG. 41 is a perspective view of a truck-left-side mudflap assembly 4100 from the top-right outer-face side, illustrating our new design in its third embodiment.

Figure 42:
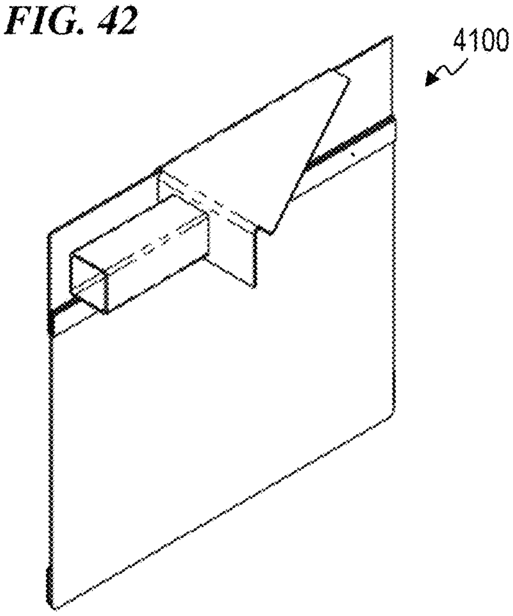

FIG. 42 is a perspective view of mudflap assembly 4100 from the top-right inner-face side.

Figure 43:
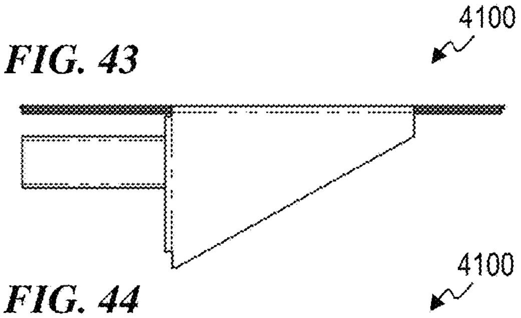

FIG. 43 is a top view of mudflap assembly 4100.

Figure 44:
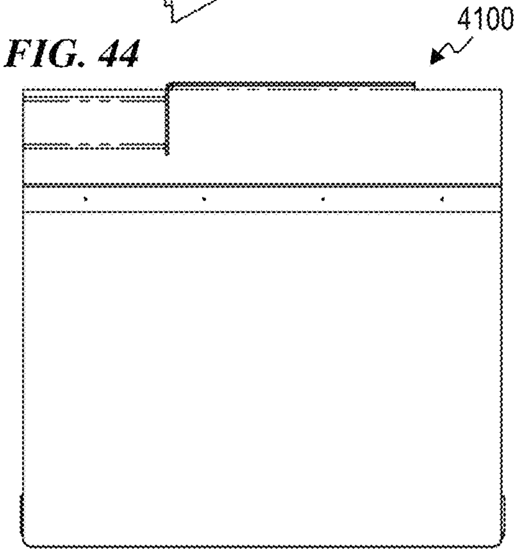

FIG. 44 is an inner-face elevation view of mudflap assembly 4100.

Figure 45:
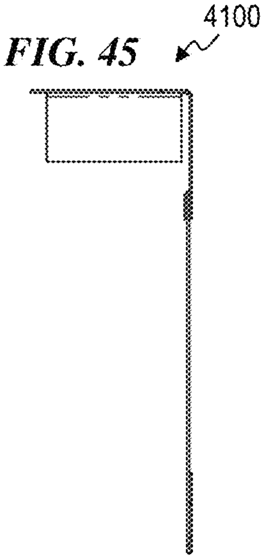

FIG. 45 is a right-end elevation view of mudflap assembly 4100.

Figure 46:
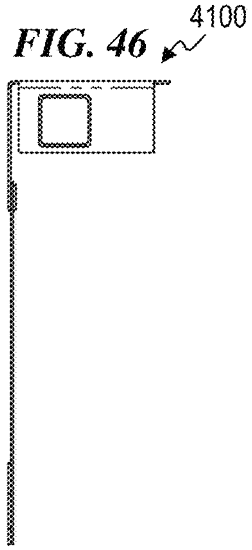

FIG. 46 is a left-end elevation view of mudflap assembly 4100.

Figure 47:
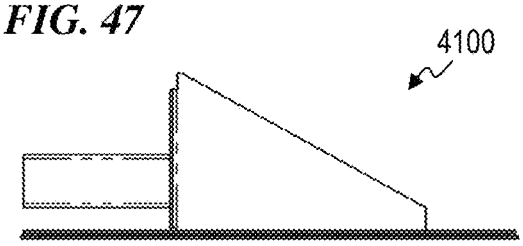

FIG. 47 is a bottom view of mudflap assembly 4100.

Figure 48:
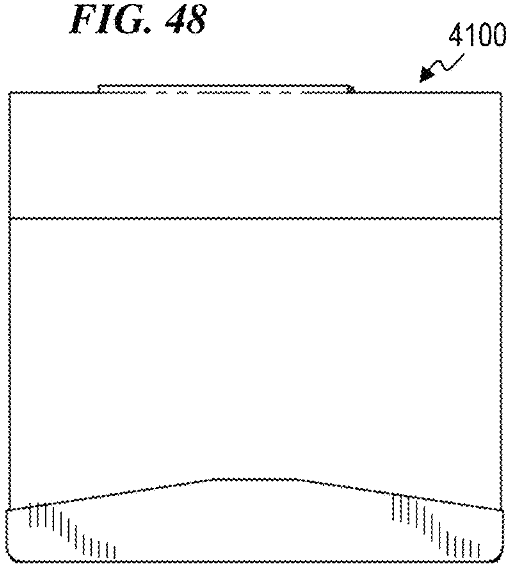

FIG. 48 is an outer-face elevation view of mudflap assembly 4100.

Figure 49:
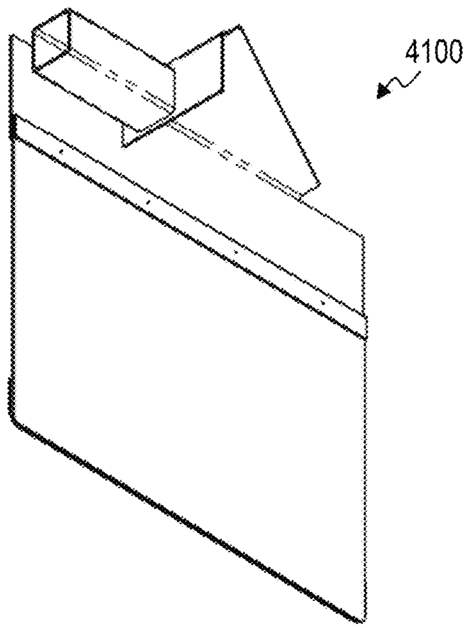

FIG. 49 is a perspective view of mudflap assembly 4100 from the bottom-right inner-face side.

Figure 50:
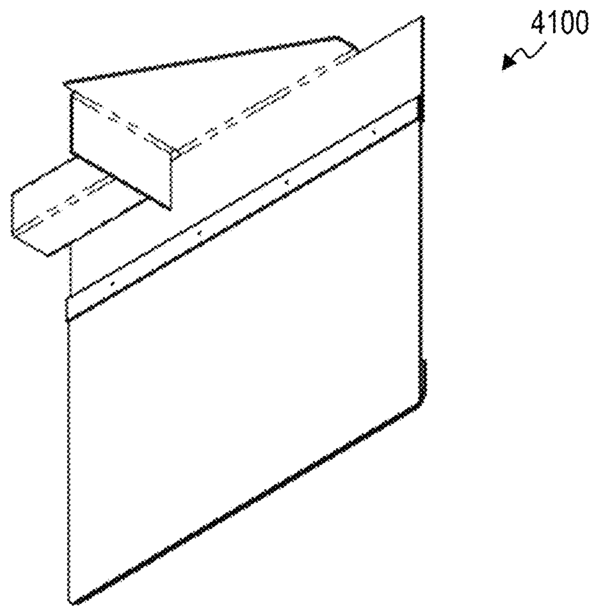

FIG. 50 is a perspective view of mudflap assembly 4100 from the bottom-left inner-face side.

Figure 51:
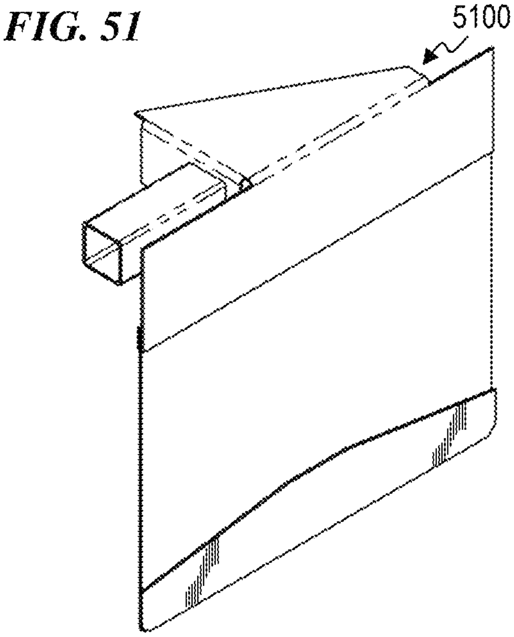

FIG. 51 is a perspective view of a truck-right-side mudflap assembly 5100 from the top-left outer-face side, illustrating our new design in its third embodiment, wherein mudflap bracket 5100 is a left-right mirror image version of mudflap bracket 4100.

Figure 52:
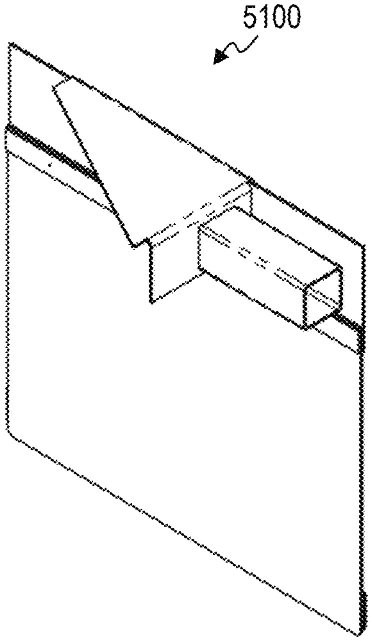

FIG. 52 is a perspective view of mudflap assembly 5100 from the top-left inner-face side.

Figure 53:
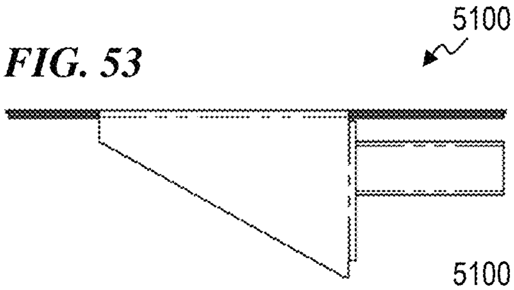

FIG. 53 is a top view of mudflap assembly 5100.

Figure 54:
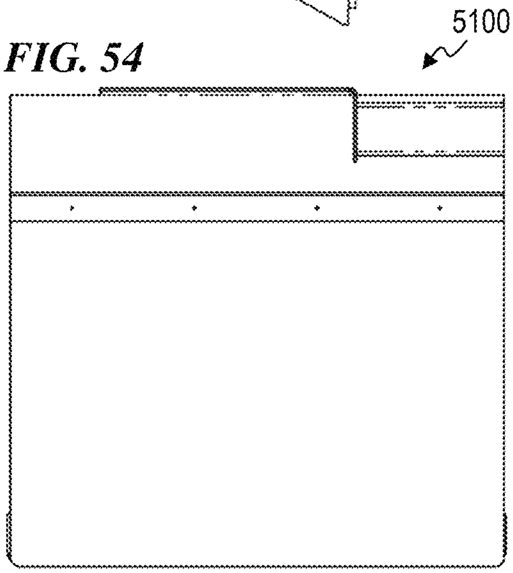

FIG. 54 is an inner-face elevation view of mudflap assembly 5100.

Figure 55:
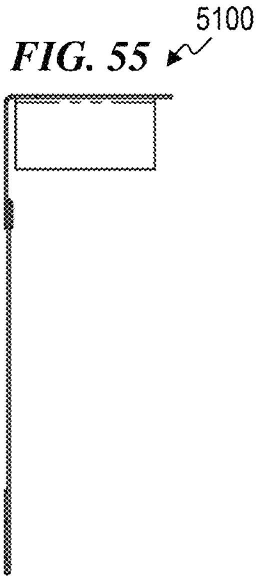

FIG. 55 is a right-end elevation view of mudflap assembly 5100.

Figure 56:
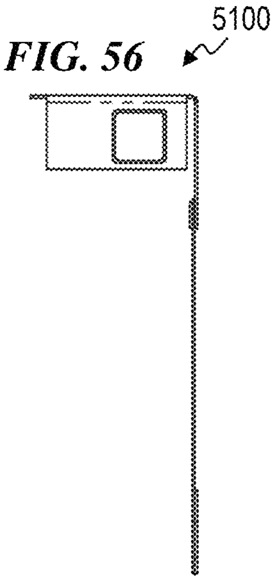

FIG. 56 is a left-end elevation view of mudflap assembly 5100.

Figure 57:
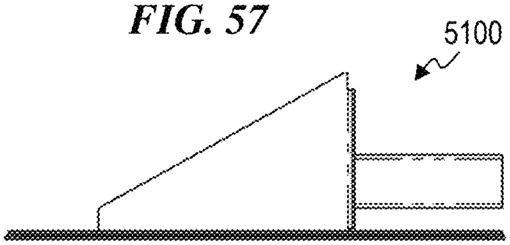

FIG. 57 is a bottom view of mudflap assembly 5100.

Figure 58:
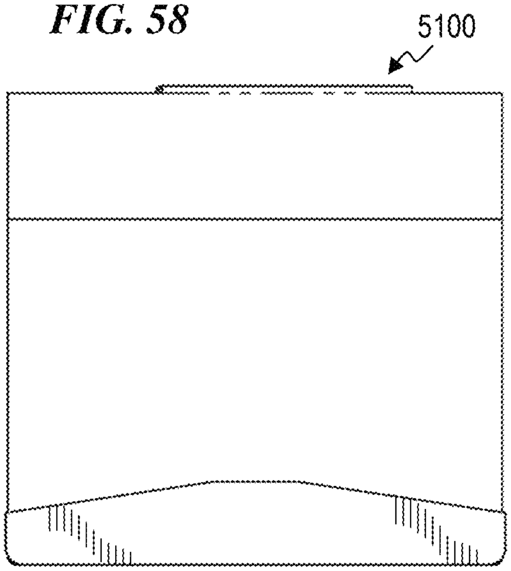

FIG. 58 is an outer-face elevation view of mudflap assembly 5100.

Figure 59:
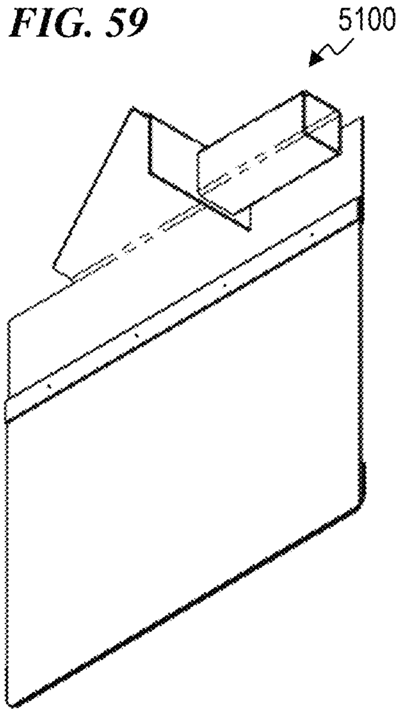

FIG. 59 is a perspective view of mudflap assembly 5100 from the bottom-right inner-face side.

Figure 60:
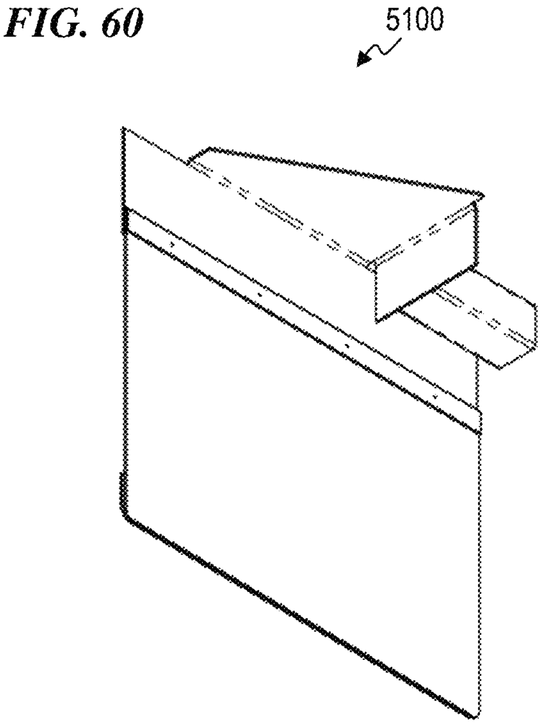

FIG. 60 is a perspective view of mudflap assembly 5100 from the bottom-left inner-face side.

In FIGS. 21-60, the thin shade lines on the surface portions indicate contour and not surface decoration. The broken lines indicate environment and are not part of the claimed design. Each claimed design includes a mirror image of the embodiment depicted.

Figure 61:
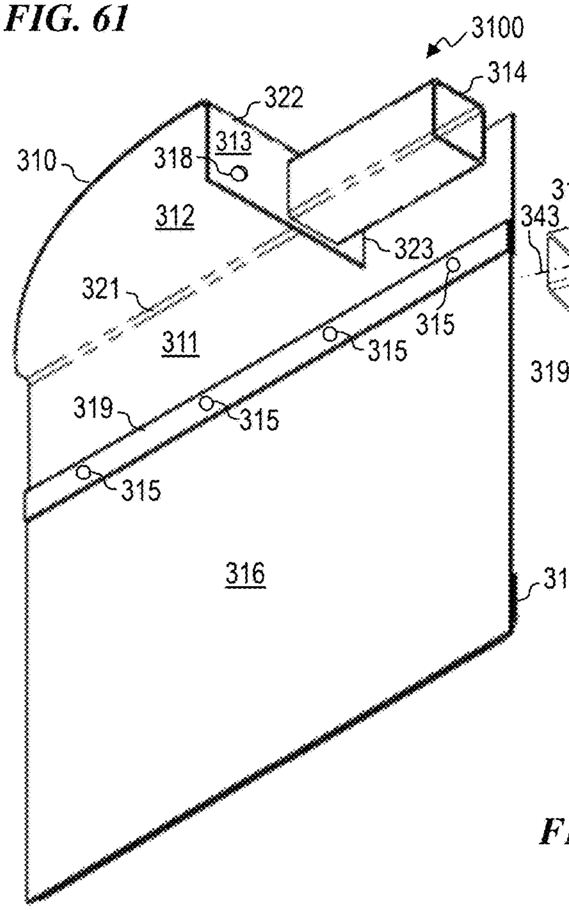

FIG. 61 is a bottom-right perspective view of a right-hand-side mudflap 3100, according to some embodiments of the invention.

Figure 62:
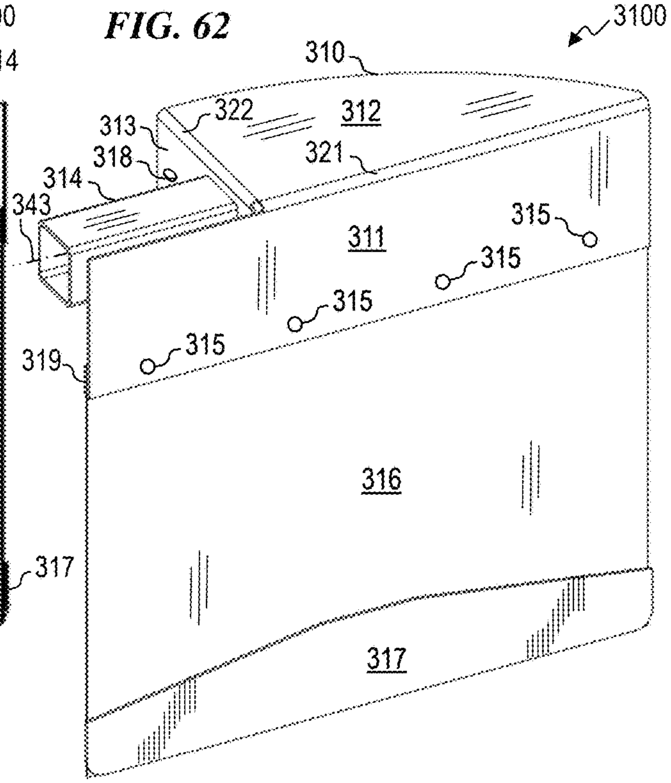

FIG. 62 is a top-right perspective view of a right-hand-side mudflap 3100, according to some embodiments of the invention.

Figure 63:
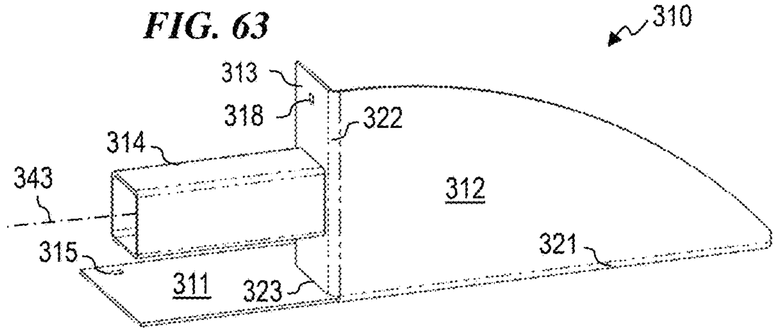

FIG. 63 is a top-right perspective view of a right-hand-side mudflap bracket 310, according to some embodiments of the invention.

Figure 64:
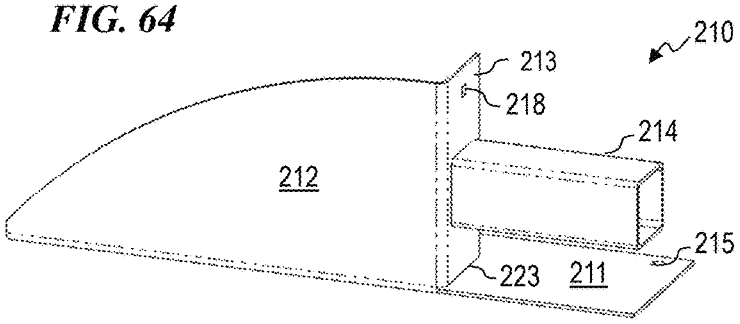

FIG. 64 is a top-left perspective view of a left-hand-side mudflap bracket 210, according to some embodiments of the invention.

Figure 65:
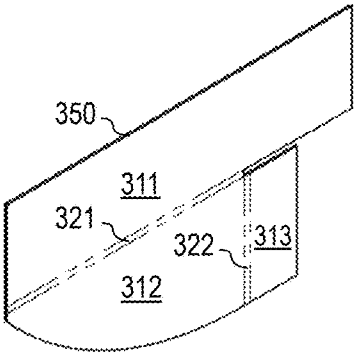

FIG. 65 is a left perspective view of a mudflap bracket plate 350, according to some embodiments of the invention.

Figure 66:
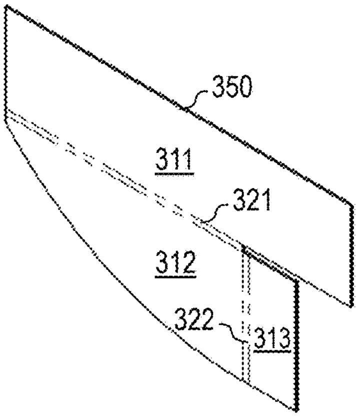

FIG. 66 is a right perspective view of a mudflap bracket plate 350, according to some embodiments of the invention.

Figure 67:
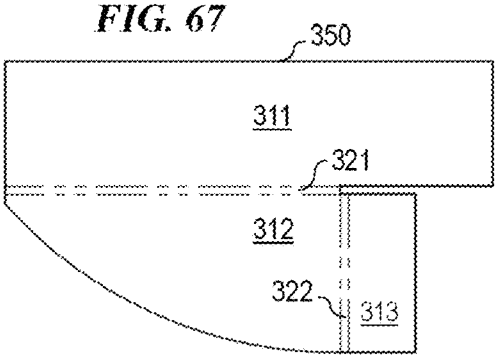

FIG. 67 is a front view of a mudflap bracket plate 350, according to some embodiments of the invention.

Figure 68:
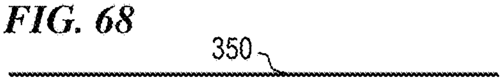

FIG. 68 is a bottom edge view of a mudflap bracket plate 350, according to some embodiments of the invention.

Figure 69:

FIG. 69 is a side edge view of a mudflap bracket plate 350, according to some embodiments of the invention.

Figure 70:
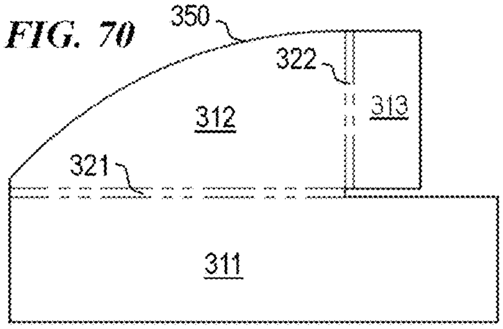

FIG. 70 is a back view of a mudflap bracket plate 350, according to some embodiments of the invention.

Figure 71:
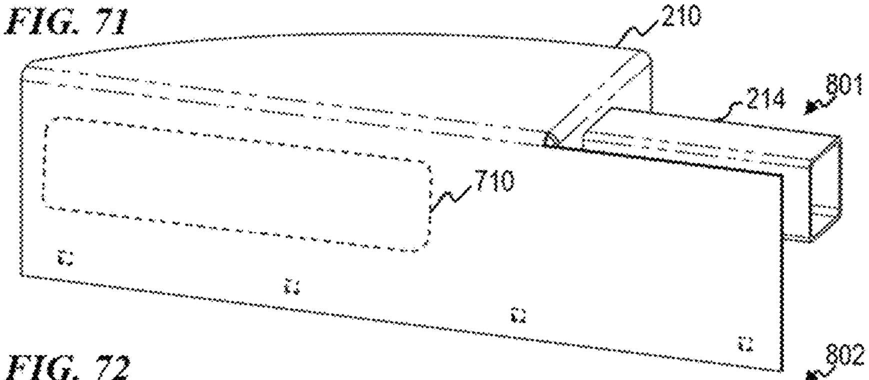

FIG. 71 is a top-right perspective view of a lighted left-hand-side mudflap bracket 801, according to some embodiments of the invention.

Figure 72:
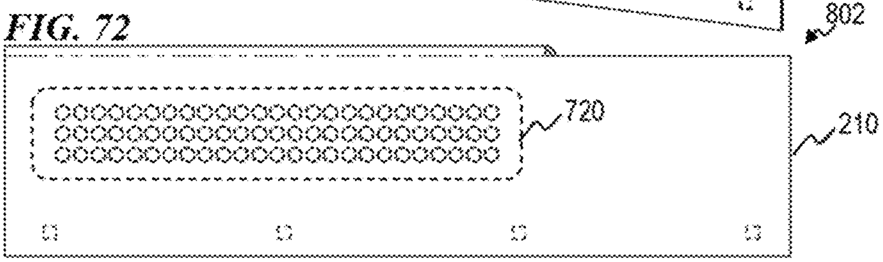

FIG. 72 is an elevation view of a lighted left-hand-side mudflap bracket 802, according to some embodiments of the invention.

Figure 73:
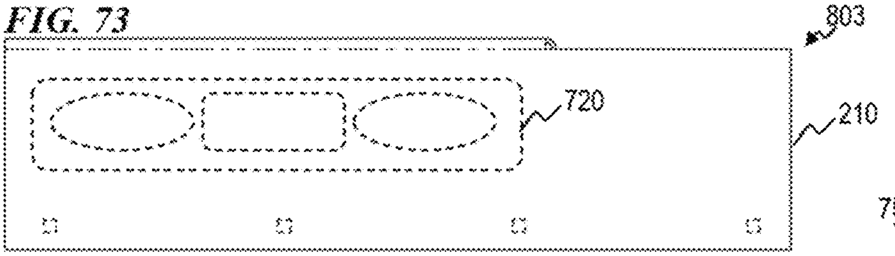

FIG. 73 is an elevation view of a lighted left-hand-side mudflap bracket 803, according to some embodiments of the invention.

Figure 74:
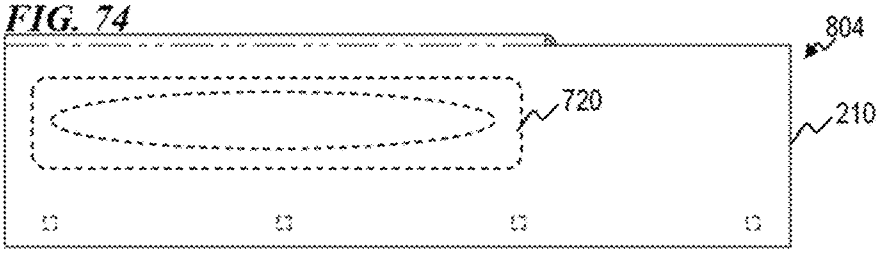

FIG. 74 is an elevation view of a lighted left-hand-side mudflap bracket 804, according to some embodiments of the invention.

Figure 75:
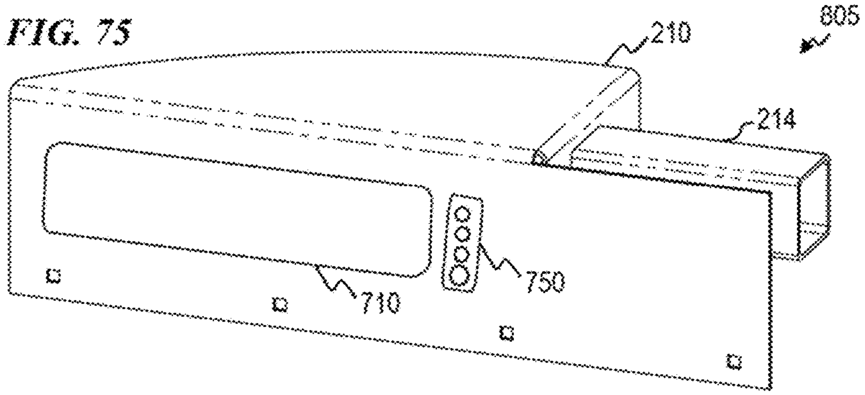

FIG. 75 is a top-right perspective view of a lighted left-hand-side mudflap bracket 805 with a feed-through power socket 750, according to some embodiments of the invention.

Figure 76:
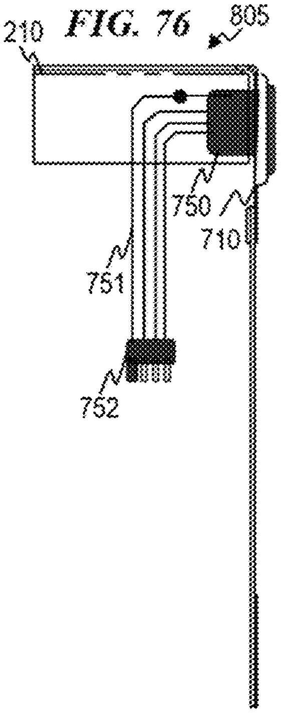

FIG. 76 is a left-side elevation of lighted left-hand-side mudflap bracket 805 with a feed-through power socket 750, according to some embodiments of the invention.

Figure 77:
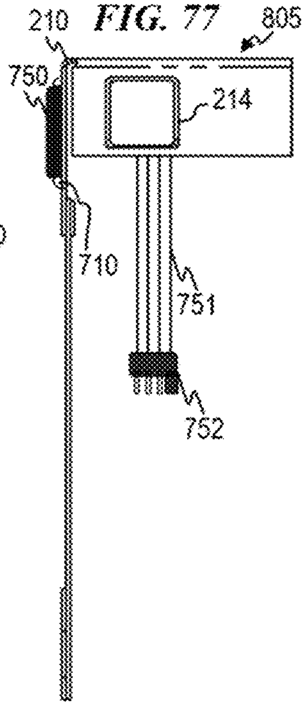

FIG. 77 is a right-side elevation of lighted left-hand-side mudflap bracket 805 with a feed-through power socket 750, according to some embodiments of the invention.

DETAILED DESCRIPTION OF THE INVENTION

Although the following detailed description contains many specifics for the purpose of illustration, a person of ordinary skill in the art will appreciate that many variations and alterations to the following details are within the scope of the invention. Specific examples are used to illustrate particular embodiments; however, the invention described in the claims is not intended to be limited to only these examples, but rather includes the full scope of the attached claims. Accordingly, the following preferred embodiments of the invention are set forth without any loss of generality to, and without imposing limitations upon the claimed invention. Further, in the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention.

It is specifically contemplated that the present invention includes embodiments having combinations and subcombinations of the various embodiments and features that are individually described herein (i.e., rather than listing every combinatorial of the elements, this specification includes descriptions of representative embodiments and contemplates embodiments that include some of the features from one embodiment combined with some of the features of another embodiment, including embodiments that include some of the features from one embodiment combined with some of the features of embodiments described in the patents and application publications incorporated by reference in the present application). Further, some embodiments include fewer than all the components described as part of any one of the embodiments described herein.

The leading digit(s) of reference numbers appearing in the Figures generally corresponds to the Figure number in which that component is first introduced, such that the same reference number is used throughout to refer to an identical component which appears in multiple Figures. Fasteners and connections may be referred to by the same reference number or label, and the actual meaning will be clear from its use in the context of the description.

FIG. 61 is a bottom-right perspective view of a right-hand-side mudflap assembly 3100, according to some embodiments of the invention. In some embodiments, mudflap assembly 3100 includes a mudflap bracket 310 attached to a mudflap 316 using a plurality of fasteners 315 such as bolts, lock washers and nuts, or rivets or other suitable fasteners. In some embodiments, a narrow reinforcement bracket 319 is also provided, and the top edge of mudflap 316 is sandwiched between the bottom edge of mudflap bracket 310 and reinforcement bracket 319. In those embodiments using bolts, lock washers and nuts for fasteners 315, the mudflap 316 is easily replaced. In some embodiments, a bottom plate 317 (such as chrome-plated steel or the like-see FIG. 62 for an example used in some embodiments) is affixed to the lower edge of mudflap 316 to provide a decorative aspect and/or weight to reduce the tendency of "flapping in the wind" as the vehicle travels at highway speeds. In some embodiments, mudflap bracket 310 is made from a first planar sheet of metal 350 (see FIGS. 65-70), such as steel, that is cut out and then folded at two right-angle bends 321 and 322 to form three planar sections, i.e., back vertical plate section 311, top horizontal plate section 312, and inside vertical plate section 313, that are each perpendicular to each other. In some embodiments, the rear vertical edge 323 of inside vertical plate section 313 is immediately adjacent back vertical plate section 311 and, in some embodiments, that rear vertical edge 323 is welded to back vertical plate section 311, thus forming a durable rigid three-dimensional (3D) structure to which post 314 is welded. In some embodiments, post 314 has a square cross-sectional shape. In some embodiments, post 314 is tapered from a slightly smaller distal end to a slightly larger proximal end at which port 314 is welded to inside vertical plate section 313. Post 314 is sized to slide into a corresponding socket on the vehicle, and a bolt is inserted through hole 318 and a corresponding hole next to the corresponding socket on the vehicle, and the bolt is secured using a lock washer and nut. The rigid 3D structure of mudflap bracket 310 and post 314 provide a strong and durable support for mudflap 316.

FIG. 62 is a top-right perspective view of a right-truck-side mudflap assembly 3100, according to some embodiments of the invention. The various reference numbers are as described for FIG. 61. In some embodiments, the plurality of fasteners 315 are removable, thus facilitating removal of a damaged or old mudflap 316 from bracket 310 and replacement with a new or different mudflap 316 (such as a vented mudflap) as needed or desired.

FIG. 63 is a top-right perspective view of a right-truck-side mudflap bracket 310 with its rear-facing face downward, according to some embodiments of the invention. The various reference numbers are as described for FIG. 61.

FIG. 64 is a top-left perspective view of a left-truck-side mudflap bracket 210 with its rear-facing face downward, according to some embodiments of the invention. In some embodiments, mudflap bracket 210 is made from a first planar sheet of metal, such as steel, that is cut out and then bent or folded at two right-angle bends 221 and 222 to form three planar sections that are perpendicular to each other, i.e., back vertical plate section 211, top horizontal plate section 212, and inside vertical plate section 213. In some embodiments, the rear vertical edge 223 of inside vertical plate section 213 is immediately adjacent back vertical plate section 211 and, in some embodiments, that rear vertical edge 223 is welded to back vertical plate section 211, thus forming a durable rigid three-dimensional (3D) structure to which post 214 is welded. Post 214 is sized to slide into a corresponding socket on the vehicle, and a bolt is inserted through hole 218 and a corresponding hole next to the corresponding socket on the vehicle, and the bolt is secured using a lock washer and nut. The rigid 3D structure of mudflap bracket 210 and post 214 provide a strong and durable support for the left-hand mudflap, which is a mirror image of the right-hand mudflap 316.

FIG. 65 is a left perspective view of a mudflap bracket plate 350, according to some embodiments of the invention. By bending at right angles towards a first side along fold lines 321 and 322, mudflap bracket plate 350 forms three planar sections that are each perpendicular to each other, i.e., back vertical plate section 211, top horizontal plate section 212, and inside vertical plate section 213. By bending at right angles towards the opposite second side along fold lines 321 and 322, mudflap bracket plate 350 forms three planar sections that are perpendicular to each other, i.e., back vertical plate section 311, top horizontal plate section 312, and inside vertical plate section 313.

FIG. 66 is a right perspective view of a mudflap bracket plate 350, according to some embodiments of the invention.

FIG. 67 is a front view of a mudflap bracket plate 350, according to some embodiments of the invention.

FIG. 68 is a bottom edge view of a mudflap bracket plate 350, according to some embodiments of the invention.

FIG. 69 is a side edge view of a mudflap bracket plate 350, according to some embodiments of the invention.

FIG. 70 is a back view of a mudflap bracket plate 350, according to some embodiments of the invention.

FIG. 71 is a top-right perspective view of a lighted left-truck-side mudflap bracket 801, according to some embodiments of the invention. In some embodiments, lighted left-hand-side mudflap bracket 801 includes left-truck-side mudflap bracket 210 with a surface-mounted LED assembly 710 (shown here in dashed-line outline, which dashed-line here does not indicate a hidden feature behind back-side vertical plate section 311, but rather indicates a non-specific arbitrary shape). In some embodiments, the metal back-side vertical plate section 311 provides a heat-sink to cool the LED assembly 710. In some embodiments, mudflap bracket 210 includes a through-hole located under LED assembly 710 through which wiring to supply electricity to LED assembly 710. In some embodiments, both the left-truck-side mudflap bracket 210 and the right-truck-side mudflap bracket 310 include mirror-image LED fixtures 710.

FIG. 72 is an elevation view of a lighted left-truck-side mudflap bracket 802, according to some embodiments of the invention. In some embodiments, lighted left-hand-side mudflap bracket 802 includes left-truck-side mudflap bracket 210 with a surface-mounted LED assembly 720 having an array of LEDs with dome-shaped lenses (shown here in dashed-line outline, which dashed-line here does not indicate a hidden feature behind back-side vertical plate section 311, but rather indicates a non-specific arbitrary shape). In some embodiments, the metal back-side vertical plate section 311 provides a heat-sink to cool the LED assembly 720. In some embodiments, mudflap bracket 210 includes a through-hole located under LED assembly 720 through which wiring to supply electricity to LED assembly 720. In some embodiments, both the left-truck-side mudflap bracket 210 and the right-truck-side mudflap bracket 310 include mirror-image LED fixtures 720.

FIG. 73 is an elevation view of a lighted left-truck-side mudflap bracket 803, according to some embodiments of the invention. In some embodiments, lighted left-hand-side mudflap bracket 803 includes left-truck-side mudflap bracket 210 with a surface-mounted LED assembly 730 having three different color and/or brightness LED subsections and/or lenses (shown here in dashed-line outline, which dashed-line here does not indicate a hidden feature behind back-side vertical plate section 311, but rather indicates a non-specific arbitrary shapes). In some embodiments, the metal back-side vertical plate section 311 provides a heat-sink to cool the LED assembly 730. In some embodiments, mudflap bracket 210 includes a through-hole located under LED assembly 730 through which wiring to supply electricity to LED assembly 730. In some embodiments, both the left-truck-side mudflap bracket 210 and the right-truck-side mudflap bracket 310 include mirror-image LED fixtures 730.

FIG. 74 is an elevation view of a lighted left-truck-side mudflap bracket 804, according to some embodiments of the invention. In some embodiments, lighted left-hand-side mudflap bracket 804 includes left-truck-side mudflap bracket 210 with a surface-mounted LED assembly 740 having three different color and/or brightness LED subsections and/or lenses (shown here in dashed-line outline, which dashed-line here does not indicate a hidden feature behind back-side vertical plate section 311, but rather indicates a non-specific arbitrary shapes). In some embodiments, the metal back-side vertical plate section 311 provides a heat-sink to cool the LED assembly 740. In some embodiments, mudflap bracket 210 includes a through-hole located under LED assembly 740 through which wiring to supply electricity to LED assembly 740. In some embodiments, both the left-truck-side mudflap bracket 210 and the right-truck-side mudflap bracket 310 include mirror-image LED fixtures 740.

FIG. 75 is a top-right perspective view of a lighted left-truck-side mudflap bracket 805 with a feed-through power socket 750, according to some embodiments of the invention. In some embodiments, lighted left-hand-side mudflap bracket 805 includes left-truck-side mudflap bracket 210 with a surface-mounted LED assembly 710. In some embodiments, the metal back-side vertical plate section 311 provides a heat-sink to cool the LED assembly 710. In some embodiments, mudflap bracket 210 includes a through-hole located under LED assembly 710 through which wiring to supply electricity to LED assembly 710. In some embodiments, a trailer-light power socket 750 (a four-conductor in-line socket is shown here, in other embodiments, other numbers of conductors and other shapes are used).

FIG. 76 is a left-side elevation of lighted left-hand-side mudflap bracket 805 with a feed-through power socket 750, according to some embodiments of the invention. In some embodiments, a trailer-light power socket 750 is coupled to a wiring cable 751 of sufficient length, and that is connected to four-conductor in-line plug 752 that is configured to connect to the truck's trailer socket to supply electricity to the four-conductor in-line socket 750 shown here as well as to supply power to LED fixture 710 from the inner-side of, in other embodiments, other numbers of conductors and other shapes are used).

FIG. 77 is a right-side elevation of lighted left-hand-side mudflap bracket 805 with a feed-through power socket 750, according to some embodiments of the invention.

In some embodiments, the present invention provides an apparatus for removable attachment to a vehicle, wherein the apparatus includes:

- a support post 314 having a center axis 343; and
- a main mudflap bracket 310 made from a first planar sheet of metal, such as steel, that is cut out and then folded at two right-angle bends 321 and 322 to form three planar sections that are perpendicular to each other including a back vertical plate section 311 that defines a rear plane of the mudflap bracket 310, a top horizontal plate section 312, and an inside vertical plate section 313, wherein a rear vertical edge 323 of inside vertical plate section 313 is immediately adjacent back vertical plate section 311 and welded to back vertical plate section 311, thus forming a durable rigid three-dimensional (3D) structure to which the support post 314 is welded such that the center axis 343 of the post is parallel to the rear plane of the mudflap bracket 310, wherein the post 314 is sized to slide into a corresponding socket on the vehicle, and configures to accept a bolt inserted through a hole 318 in inside vertical plate section 313 and a corresponding hole next to the corresponding socket on the vehicle, and configures such that the bolt is secured using a lock washer and nut.

Some embodiments of the apparatus further include: a mudflap 316, and a reinforcing bracket 319, wherein an upper edge portion of the mudflap is affixed to the mudflap bracket 310 by a plurality of fasteners that pass through the reinforcing bracket 319, the upper edge portion of the mudflap 316 and the main mudflap bracket 310.

The rigid 3D structure of main mudflap bracket 310 and post 314 provide a strong and durable support for mudflap 316.

Some embodiments of the apparatus further include: a bottom plate 317 (such as chrome-plated steel or the like) that is affixed to the lower edge of mudflap 316 to provide a decorative aspect and/or weight to reduce the tendency of "flapping in the wind" as the vehicle travels at highway speeds.

In some embodiments, the present invention provides an apparatus that includes: a mudflap bracket made from a first planar sheet of metal, such as steel, that is cut out and then folded at two right-angle bends 221 and 222 to form three planar sections that are perpendicular to each other, i.e., back vertical plate section 211, top horizontal plate section 212, and inside vertical plate section 213. In some embodiments, the rear vertical edge 223 of inside vertical plate section 213 is immediately adjacent back vertical plate section 211 and, in some embodiments, that rear vertical edge 223 is welded to back vertical plate section 211, thus forming a durable rigid 3D structure to which post 214 is welded. Post 214 is sized to slide into a corresponding socket on the vehicle, and a bolt is inserted through hole 218 and a corresponding hole next to the corresponding socket on the vehicle, and the bolt is secured using a lock washer and nut. The rigid 3D structure of mudflap bracket 210 and post 214 provide a strong and durable support for mudflap 216.

It is to be understood that the above description is intended to be illustrative, and not restrictive. Although numerous characteristics and advantages of various embodiments as described herein have been set forth in the foregoing description, together with details of the structure and function of various embodiments, many other embodiments and changes to details will be apparent to those of skill in the art upon reviewing the above description. The scope of the invention should be, therefore, determined with reference to the appended claims, along with the full scope of equivalents to which such claims are entitled. In the appended claims, the terms "including" and "in which" are used as the plain-English equivalents of the respective terms "comprising" and "wherein," respectively. Moreover, the terms "first," " "second," and "third," etc., are used merely as labels, and are not intended to impose numerical requirements on their objects.

We claim:

1. An apparatus comprising:

a first mudflap bracket formed from a planar sheet of metal to have first and second right-angle bends that define three integrally connected planar sections arranged perpendicular to one another, wherein the three planar sections include:

a back vertical plate section configured to attach to a first mudflap;

a horizontal plate section extending from the back vertical plate section; and an inside vertical plate section extending from the horizontal plate section, wherein a rear vertical edge of the inside vertical plate section is positioned adjacent to the back vertical plate section to form a first rigid three-dimensional bracket structure;

a post fixed to the first rigid three-dimensional bracket structure, the post being dimensioned for insertion into a vehicle-mounted socket.

2. The apparatus of claim 1, further comprising the first mudflap attached to the first mudflap bracket.

3. The apparatus of claim 1, further comprising the first mudflap, and a reinforcing bracket, wherein an upper edge portion of the first mudflap is affixed to the back vertical plate section by a plurality of fasteners that pass through the reinforcing bracket, an upper edge portion of the first mudflap and the back vertical plate section.

4. The apparatus of claim 1, further comprising a through-hole formed in the rigid three-dimensional bracket structure, wherein the through-hole is positioned to align with a corresponding vehicle hole adjacent the vehicle-mounted socket and configured to receive a fastener, wherein, when the post is inserted into the vehicle-mounted socket and the fastener extends through the through-hole and the corresponding vehicle hole of the vehicle, the first mudflap bracket is retained in a mounted position on the vehicle.

5. The apparatus of claim 1, wherein the horizontal plate section of the first mudflap bracket extends from a top of the back vertical plate section to a top of the inside vertical plate section.

6. The apparatus of claim 1, wherein the post of the first mudflap bracket has longitudinal axis parallel to the back vertical plate section and a rectangular cross section in a plane perpendicular to the longitudinal axis.

7. The apparatus of claim 1, wherein the post of the first mudflap bracket has longitudinal axis parallel to the back vertical plate section and a square cross section in a plane perpendicular to the longitudinal axis.

8. The apparatus of claim 1, wherein the post of the first mudflap bracket has longitudinal axis parallel to the back vertical plate section and wherein the post is fixed to the first rigid three-dimensional bracket structure by welding to the inside vertical plate section.

9. The apparatus of claim 1, further comprising an LED light fixture affixed to the first mudflap bracket.

10. The apparatus of claim 1, wherein the rear vertical edge of the inside vertical plate section of the first mudflap bracket is welded to the back vertical plate section to form the first rigid three-dimensional bracket structure.

11. The apparatus of claim 1, further comprising:

a second mudflap bracket formed from a planar sheet of metal to have first and second right-angle bends that define three integrally connected planar sections arranged perpendicular to one another, wherein the three planar sections include:

a back vertical plate section configured to attach to a second mudflap;

a horizontal plate section extending from the back vertical plate section; and an inside vertical plate section extending from the horizontal plate section, wherein a rear vertical edge of the inside vertical plate section is positioned adjacent to the back vertical plate section to form a second rigid three-dimensional bracket structure;

a post fixed to the second rigid three-dimensional bracket structure, the post being dimensioned for insertion into a vehicle-mounted socket.

12. The apparatus of claim 11, further comprising the second mudflap attached to the second mudflap bracket.

13. The apparatus of claim 11, wherein the rear vertical edge of the inside vertical plate section of the second mudflap bracket is welded to the back vertical plate section to form the second rigid three-dimensional bracket structure.

14. A method of making a mudflap bracket, comprising:

providing a single planar sheet of metal;

cutting the planar sheet of metal to define an outline of the mudflap bracket;

forming a first right-angle bend in the planar sheet to create a back vertical plate section and a horizontal plate section extending from the back vertical plate section;

forming a second right-angle bend in the planar sheet to create an inside vertical plate section extending from the horizontal plate section, wherein the back vertical plate section, the horizontal plate section, and the inside vertical plate section are arranged perpendicular to one another;

positioning a rear vertical edge of the inside vertical plate section adjacent to the back vertical plate section;

fixing the rear vertical edge of the inside vertical plate section to the back vertical plate section to form a rigid three-dimensional bracket structure; and welding a post to the rigid three-dimensional bracket structure.

15. The method of claim 14, wherein fixing the rear vertical edge comprises welding the rear vertical edge to the back vertical plate section.

16. The method of claim 14, wherein the planar sheet of metal comprises steel.

17. The method of claim 14, wherein the welding of the post to the rigid three-dimensional bracket structure includes welding the post to the inside vertical plate section.

18. The method of claim 14, further comprising forming a through-hole in the rigid three-dimensional bracket structure, the through-hole being configured to receive a fastener for mounting the mudflap bracket to a vehicle.

19. The method of claim 14, further comprising attaching the mudflap to the mudflap bracket.

20. The method of claim 14, further comprising providing the mudflap and a reinforcing bracket; and affixing an upper edge portion of the mudflap to the back vertical plate section by a plurality of fasteners that pass through the reinforcing bracket, an upper edge portion of the mudflap and the back vertical plate section.

* * * * *